(12) United States Patent
Moriguchi et al.

(10) Patent No.: US 7,206,588 B2
(45) Date of Patent: Apr. 17, 2007

(54) COMMUNICATION DEVICE AND COMMUNICATION SYSTEM

(75) Inventors: Ken-ichi Moriguchi, Neyagawa (JP); Takeshi Hatakeyama, Neyagawa (JP)

(73) Assignee: Matsushita Electric Industrial Co., Ltd., Osaka (JP)

( * ) Notice: Subject to any disclaimer, the term of this patent is extended or adjusted under 35 U.S.C. 154(b) by 767 days.

(21) Appl. No.: 10/382,654

(22) Filed: Mar. 7, 2003

(65) Prior Publication Data

US 2004/0203918 A1  Oct. 14, 2004

(30) Foreign Application Priority Data

Sep. 13, 2002  (JP) ............... 2002-269190

(51) Int. Cl.
 *H04Q 7/20* (2006.01)
(52) U.S. Cl. ............... 455/456.1; 455/456.2; 455/456.6
(58) Field of Classification Search ............ 455/456.1, 455/456.2, 456.3, 456.4, 456.6, 456.7, 457
See application file for complete search history.

(56) References Cited

U.S. PATENT DOCUMENTS

| | | | |
|---|---|---|---|
| 5,999,126 A | * | 12/1999 | Ito .................. 342/357.1 |
| 6,091,956 A | * | 7/2000 | Hollenberg ............ 455/456.5 |
| 6,611,687 B1 | * | 8/2003 | Clark et al. ............ 455/456.5 |
| 6,707,422 B2 | * | 3/2004 | Sheynblat et al. ...... 342/357.12 |
| 6,721,572 B1 | * | 4/2004 | Smith et al. ........... 455/456.1 |
| 6,799,050 B1 | * | 9/2004 | Krasner ................ 455/456.1 |

FOREIGN PATENT DOCUMENTS

| | | |
|---|---|---|
| JP | 4-286430 | 10/1992 |
| JP | 10-093497 | 4/1998 |
| JP | 10-313484 | 11/1998 |
| JP | 11-018159 | 1/1999 |

* cited by examiner

*Primary Examiner*—Bing Q. Bui
(74) *Attorney, Agent, or Firm*—Wenderoth, Lind & Ponack, L.L.P.

(57) ABSTRACT

Estimates of a position of a communication device after a specific time are determined according to a position detecting unit that detects a current position of the communication device, a communication status storage unit that stores communication status data indicating a wireless communication status at each position, and the position detected by the position detecting unit. The communication device includes a prediction unit that predicts the wireless communication status at the position with reference to the communication status data, and a prediction processing unit that executes a handling process for disconnection of the communication due to deterioration of the wireless communication status based on a prediction result by the prediction unit.

49 Claims, 24 Drawing Sheets

FIG. 4

| A1 | A2 |
|---|---|
| POSITION INFORMATION | COMMUNICATION LEVEL |
| LATITUDE X1, LONGITUDE Y1 | 1 |
| LATITUDE X2, LONGITUDE Y2 | 9 |
| LATITUDE X3, LONGITUDE Y3 | 10 |
| LATITUDE X4, LONGITUDE Y4 | 2 |
| ⋮ | ⋮ |

COMMUNICATION STATUS DATA 202a

FIG. 11A

YOU CANNOT MAKE A CALL BECAUSE COMMUNICATION STATUS GETS WORSE SHORTLY.

PREDICTED TIME ALLOWED FOR CALL: 1 MINUTE

RELEASE REGULATION

RECEIVING CALL, BUT CANNOT ANSWER BECAUSE COMMUNICATION STATUS GETS WORSE SHORTLY.

PREDICTED TIME ALLOWED FOR CALL : 1 MINUTE

RELEASE REGULATION

206

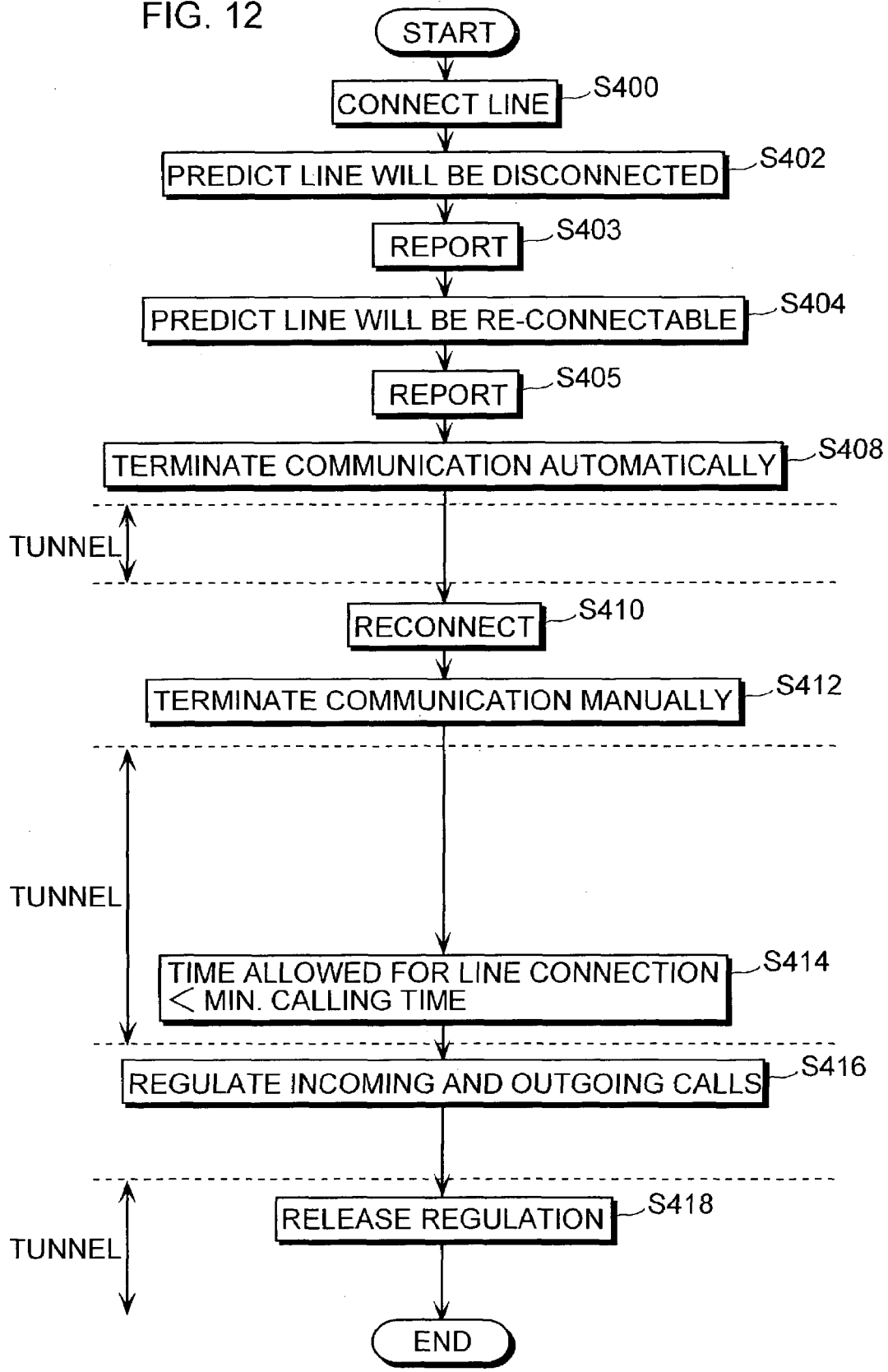

FIG. 15

| | A11 | A12 |
| --- | --- | --- |
| | POSITION INFORMATION | COMMUNICATION LEVEL |
| | LATITUDE X1, LONGITUDE Y1 | 1 |
| | LATITUDE X2, LONGITUDE Y2 | 9 |
| | LATITUDE X3, LONGITUDE Y3 | 10 |
| | LATITUDE X4, LONGITUDE Y4 | 2 |
| | ⋮ | ⋮ |

COMMUNICATION STATUS DATA 117a

FIG. 16

| TIME INFORMATION | COMMUNICATION LEVEL |
|---|---|
| AFTER 1 MIN. | 1 |
| AFTER 2 MIN. | 3 |
| AFTER 3 MIN. | 4 |
| AFTER 4 MIN. | 2 |
| ⋮ | ⋮ |
| AFTER 10 MIN. | 6 |

B1 = TIME INFORMATION column
B2 = COMMUNICATION LEVEL column

PREDICTION DATA 118a

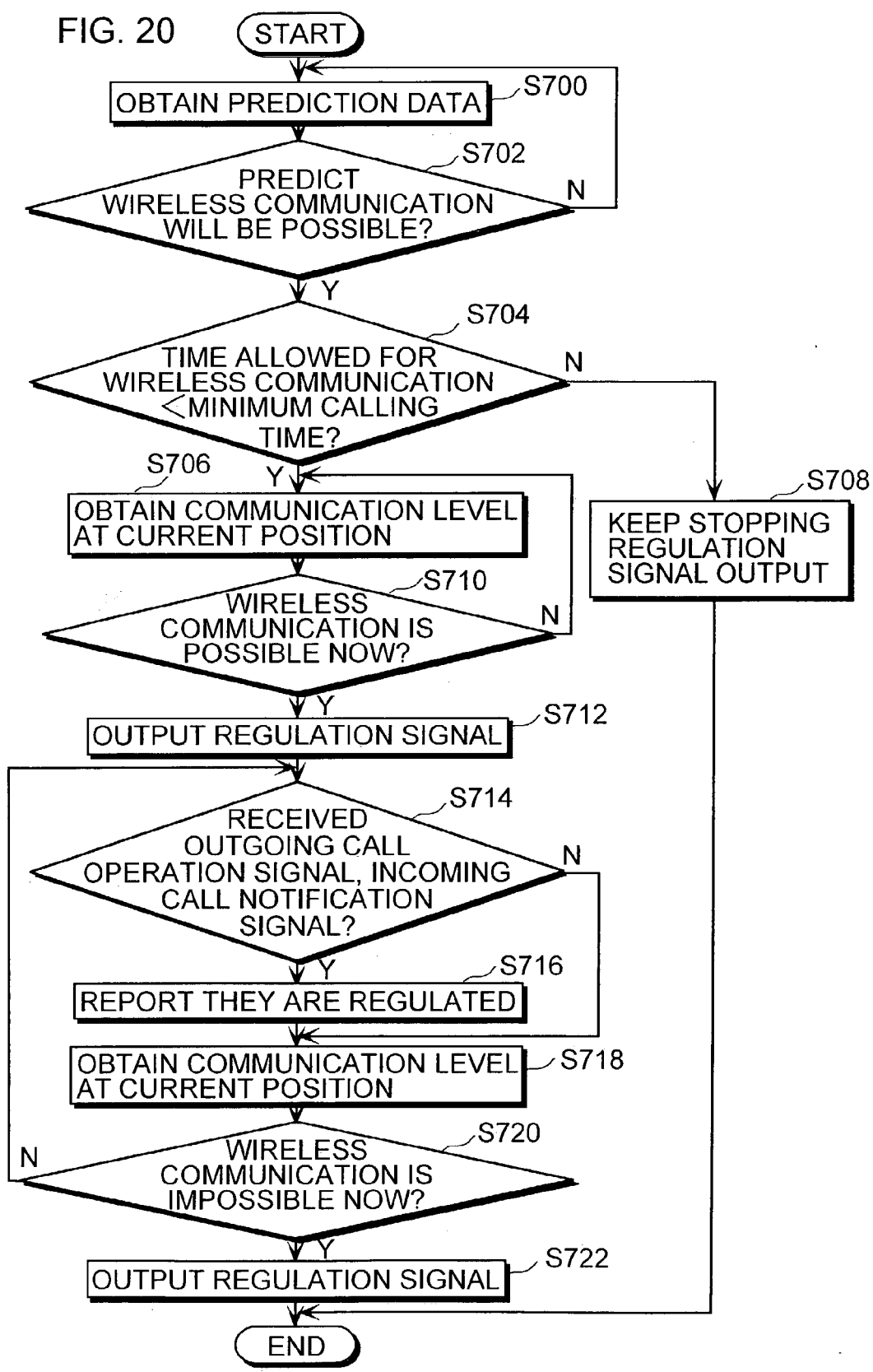

FIG. 21A

YOU CANNOT MAKE A CALL BECAUSE COMMUNICATION STATUS GETS WORSE SHORTLY.

PREDICTED TIME ALLOWED FOR CALL
: 1 MINUTE

PRESS 1 TO RELEASE REGULATION

FIG. 21B

RECEIVING CALL, BUT CANNOT ANSWER BECAUSE COMMUNICATION STATUS GETS WORSE SHORTLY.

PREDICTED TIME ALLOWED FOR CALL
: 1 MINUTE

PRESS 1 TO RELEASE REGULATION

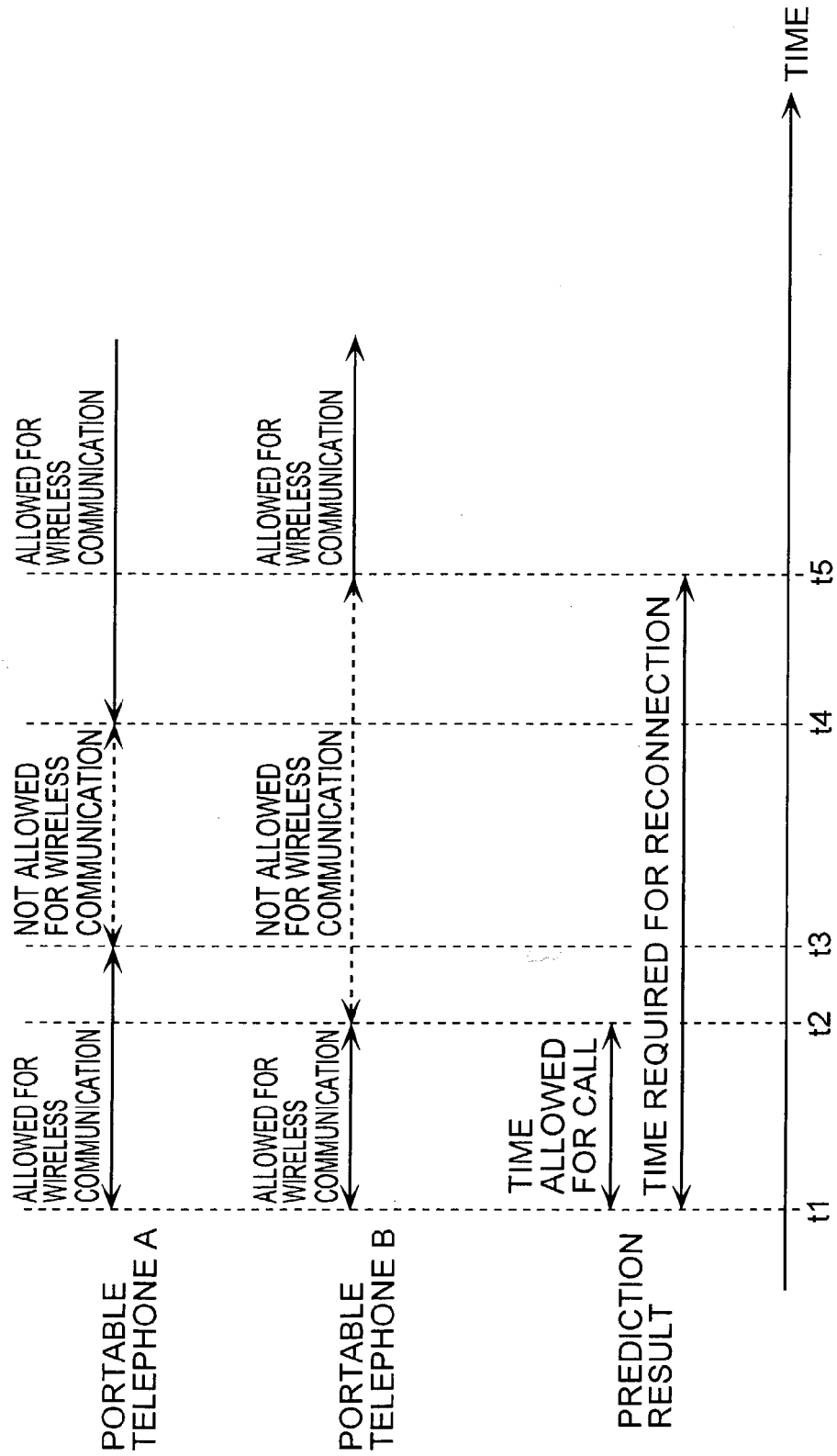

COMMUNICATION DEVICE AND COMMUNICATION SYSTEM

BACKGROUND OF THE INVENTION (1) Field of the Invention

The present invention relates to a communication device and a communication system that performs communication via a wireless communication medium. The present invention especially relates to a mobile communication device installed to/in a mobile object like an automobile or carried with a user, and to a communication system equipped with the communication device.

(2) Description of the Related Art

In recent years, an automobile telephone and a portable telephone that perform communication via a wireless communication medium, and a communication device such as a hands-free device that enables a user to perform communication without holding the device in his hand, have become popular.

This type of the communication device is movable with an automobile if it is installed to/in the automobile, or is movable with a user if it is carried by the user. Because of this, if the automobile or the user moves to an area where a radio wave, as a wireless communication medium, does not easily reach, i.e. an area in a poor communication status, it becomes impossible to perform communication with a device such as another telephone, and a telephone call may suddenly be disconnected. For example, since the communication status is not good in a tunnel or in a mountainous area, any communication becomes impossible for the communication device installed to/in the automobile when the automobile drives through such areas.

Therefore, a communication device which informs of the fact when approaching an area in the poor communication status has already been proposed as a conventional invention. (For example, see Japanese Laid-Open Patent Application No. 4-286430 (Patent Document 1).)

FIG. 1 shows a structure diagram of a communication device (an automobile telephone) in the above Patent Document 1.

As shown in FIG. 1, the communication device in the Patent Document 1 is a device installed in the automobile, and includes following elements: a geomagnetic sensor 901 that detects a driving direction of the automobile; a speed sensor 902 that detects a driving speed of the automobile; a map data memory unit 903 that memorizes a map; a distribution data memory unit 904 that memorizes a distribution map of a radio wave electric field intensity; a location unit 905 that detects a current location of the automobile, etc.; a telephone 906; a display unit 907 that displays characters and graphics; a speaker 908; an alarm lamp 909; and a main controller 910 that controls the telephone 906, the display unit 907 and the like.

In this communication device, the location unit 905 specifies the current position of the automobile on the map memorized in the map data memory unit 903 according to a detected result of a geomagnetic sensor 901 and the speed sensor 902, and predicts a time and a distance in which it is possible to perform communication through the telephone 906 with reference to the distribution map of the radio wave electric field intensity memorized in the distribution data memory unit 904. Then, the main controller 910 controls the display unit 907, the speaker 908 and the alarm lamp 909 based on the predicted result, and pre-informs the user that the automobile approaches an area in the bad communication status and that a phone call is going to be disconnected.

Also, similar to the communication device in the Patent Document 1, a communication device installed in the automobile has been provided which pre-alarms the user that the automobile approaches an area in the bad communication status and that a telephone call is going to be disconnected, specifies the current location of the automobile through GPS functions, and notifies a time and a distance in which it is possible for communication to be performed between the user and his calling party (for example, see the Japanese Laid-Open Patent Application No. 10-93497 (Patent Document 2).)

Additionally, there is a proposed communication device which suspends the user's outgoing call operation to prevent a sudden disconnection of a telephone call when the user approaches the area in the bad communication status (for example, see the Japanese Laid-Open Patent Application No. 10-313484 (Patent Document 3).)

The communication device (a hands-free device) of this Patent Document 3 is a device installed in/to the automobile, predicts whether or not the automobile reaches the area in the bad communication status after a specific time from the current location, and suspends an outgoing call if the automobile reaches the area. Then, the communication device makes the outgoing call, which had been suspended once as described above, when the communication device reaches an area in the good communication status. By doing so, the communication device prevents the sudden disconnection of telephone calls.

Although the communication devices in the Patent Document 1 and the Patent Document 2 pre-inform that the area in the bad communication status is approaching and that the telephone call is disconnected, the user needs to operate the telephone by himself to terminate the communication normally, which makes the user feel somewhat troubled.

Also, in the communication device in the Patent Document 3, a telephone call may suddenly be disconnected if a call is made and is connected to a telephone line but the communication device subsequently goes into an area in the bad communication status. Then, in the same way as in the communication devices in Patent Document 1 and the Patent Document 2, the communication device in the Patent Document 3 requires the user's operation to terminate the communication normally due to the deteriorating communication status, which makes the user feel annoyed.

Furthermore, if one of the devices in the Patent Document 1, Patent Document 2 and Patent Document 3 is installed in/to the automobile and operated by a driver, i.e. the user, he/she is required to drive the automobile while being annoyed by a troublesome operation, which may cause a car accident due to a lack of concentration on driving.

SUMMARY OF THE INVENTION

In view of the above problems, an object of the present invention is to provide a communication device and a communication system that reduce the user's nuisances in a situation in which the user is moving through an area in a bad communication status such as a tunnel or a mountainous area.

To achieve the above object, the present invention provides, a communication device that is mobile and performs communication via a wireless communication medium. The communication device comprises: a position detecting unit operable to detect a current position of the communication device; a communication status retaining unit operable to retain communication status data content indicating a wireless communication status at each position of the communication device; a prediction unit operable to estimate a position of the communication device at the time when a specific time elapses according to the position detected by the position detecting unit, and predict the wireless communication status at the position with reference to the communication status data; and a processing unit operable to execute a handling process for disconnecting the communication due to deterioration of the wireless communication status based on a prediction result by the prediction unit.

In this way, a status of wireless communication is predicted and a process is executed for a measure against disconnection of the communication according to degradation of the communication status. Therefore, even if the communication device is moved through the area in the bad communication status such as a tunnel or a mountainous area, the communication device does not require any operations on the part of the user to cope with a change in the status of communication and can thereby reduce the user's nuisances.

Additionally, the processing unit may have a feature to terminate communication when the communication is predicted to be disconnected based on a prediction result by the prediction unit.

In this way, the user's annoyance is reduced because the communication device does not require any operations to terminate the communication even if the user brings the communication device into, for example, a tunnel.

Moreover, the processing unit may have features to specify the wireless communication status at the position detected by the position detecting unit with reference to the communication status data, and execute a reconnection process when the disconnected communication is decided to be re-connectable based on the specified wireless communication status.

By doing so, when the user who's carrying the communication device gets out from the tunnel, the communication is reconnected without requiring the user's connection operation so as to reduce annoyance of the user.

In order to achieve above objective, the present invention provides a communication system in which a mobile communication device communicates with another communication device via a wireless communication medium. The communication device comprises: a mobile communication device that performs wireless communication; a position detecting unit that detects a position of the mobile communication device; a communication status storage unit that retains communication status data content indicating a wireless communication status at each position; a prediction unit that estimates a position of the mobile communication device at the time when a specific time elapses based on the position detected by the position detecting unit, and predicts the wireless communication status at the position with reference to the communication status data; and a processing unit that executes a handling process for disconnecting the communication between the mobile communication device and the other communication device due to a deterioration of the communication status based on a prediction result by the prediction unit.

In this way, the wireless communication status of the mobile communication device is predicted and a process is executed for a measure against disconnection of the communication between the mobile communication device and the other communication device due to the deteriorating status of the wireless communication. Therefore, nuisances of the user of the mobile communication device are lightened because the user is not required to perform any operation even in a changeable situation in which the mobile communication device is moved to an area in the poor communication status such as tunnels and mountainous areas.

The processing unit may also include a feature of having the mobile communication device terminate the communication when the communication between the mobile communication device and the other communication device is predicted to be impossible based on the prediction result of the prediction unit.

By doing so, even if the user of the mobile communication device takes the mobile communication device with him/her into a tunnel, etc., the user is not required to terminate the communication so that the user's annoyance is removed.

Additionally, the communication system may further include a relaying unit that relays a signal exchanged between the mobile communication device and the communication device. Further, the processing unit specifies a wireless communication status at the position detected by the position detecting unit with reference to the communication status data, and maintains the communication between the relaying unit and the communication device and puts the communication device on hold when deciding the communication between the mobile communication device and the relaying unit becomes impossible based on the specified wireless communication status.

In this way, when the user of the mobile communication device carries the mobile communication device with him/her and goes through somewhere such as a tunnel, the communication device is put on hold. Therefore, the user of the communication device is not required to perform any operations for the communication device other than waiting, so that the annoyance that the user of the communication device may feel can be lightened.

The present invention may also be embodied as a communication method used for a mobile communication device to communicate via a wireless communication medium, as a communication method used for a communication system to make a mobile communication device communicate with another communication device via a wireless communication medium, and as a program to have a computer execute steps included in these methods.

Further Information about the Technical Background to this Application

The following applications are incorporated herein by references:

Japanese Patent Application No. 2003-013361, filed Jan. 22, 2003;

Japanese Patent Application No. 2003-013362, filed Jan. 22, 2003;

Japanese Patent Application No. 2002-269190, filed Sep. 13, 2002.

BRIEF DESCRIPTION OF DRAWINGS

These and the other objects, advantages and features of the invention will become apparent from the following description when taken in conjunction with the accompanying drawings, which illustrate specific embodiments of the invention.

FIG. 4 is a data content diagram to show the content of communication status data.

FIG. 11 is a diagram to show a sample screen displayed in a display unit.

FIG. 12 is an action flow diagram to show characteristic actions taken by the communication device.

FIG. 15 is a data content diagram to show the content of communication status data.

FIG. 16 is a data content diagram to show the content of prediction data.

FIG. 20 is an action flow diagram to show a sample action taken by a call regulation unit.

FIG. 21 is a screen diagram to show a sample screen displayed in a display unit.

FIG. 24 is an explanatory diagram to describe a prediction method for a time reporting unit to predict a calling time and reconnection time in the variation sample.

DETAILED DESCRIPTION OF THE PREFERRED EMBODIMENTS

The following specifically describes the present invention based on several embodiments with reference to the drawings.

First Embodiment

The following describes a communication device according to a first embodiment of the present invention.

Figure 1:
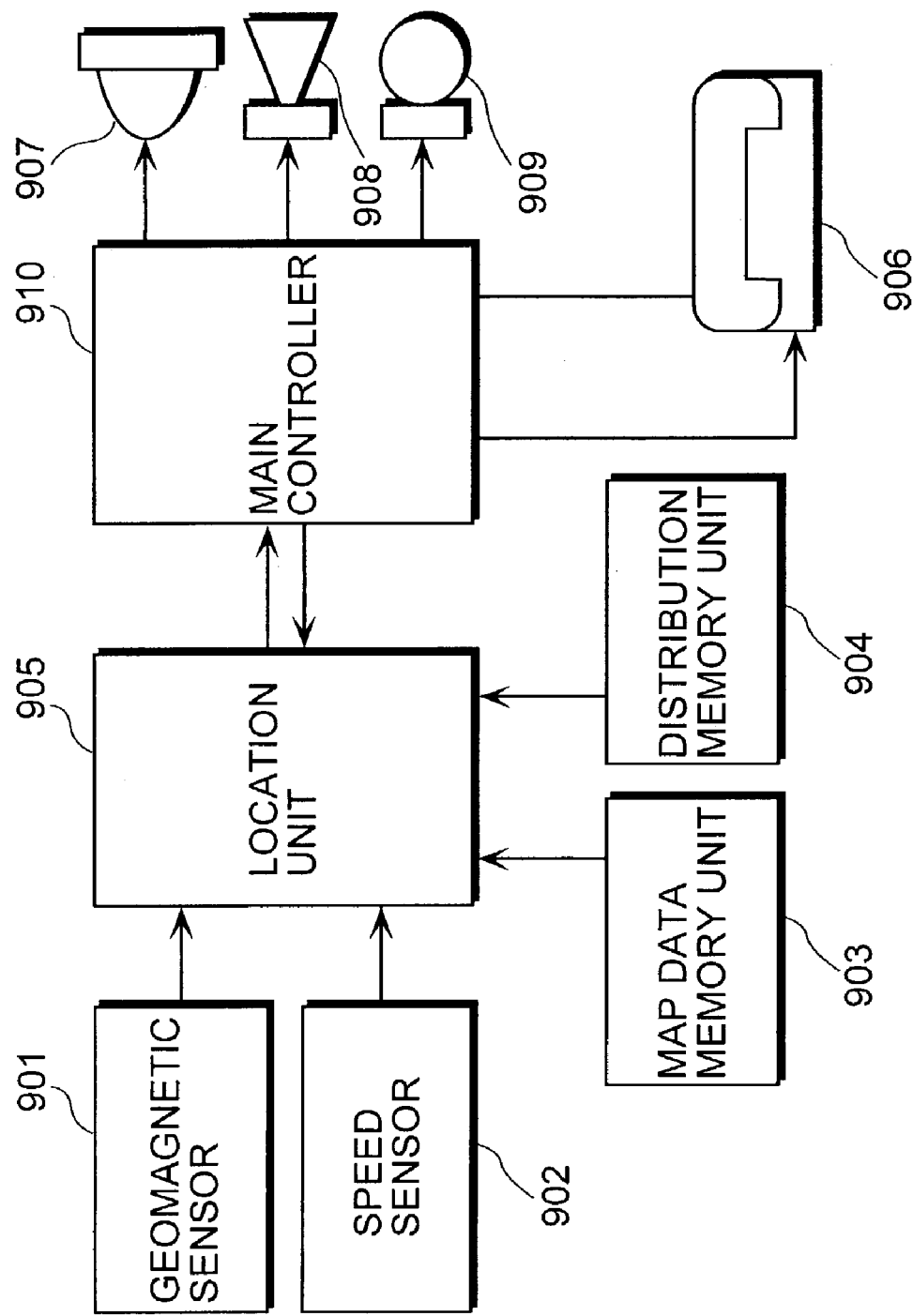
FIG. 1 is a diagram to show a structure of a conventional communication device.
Figure 2:
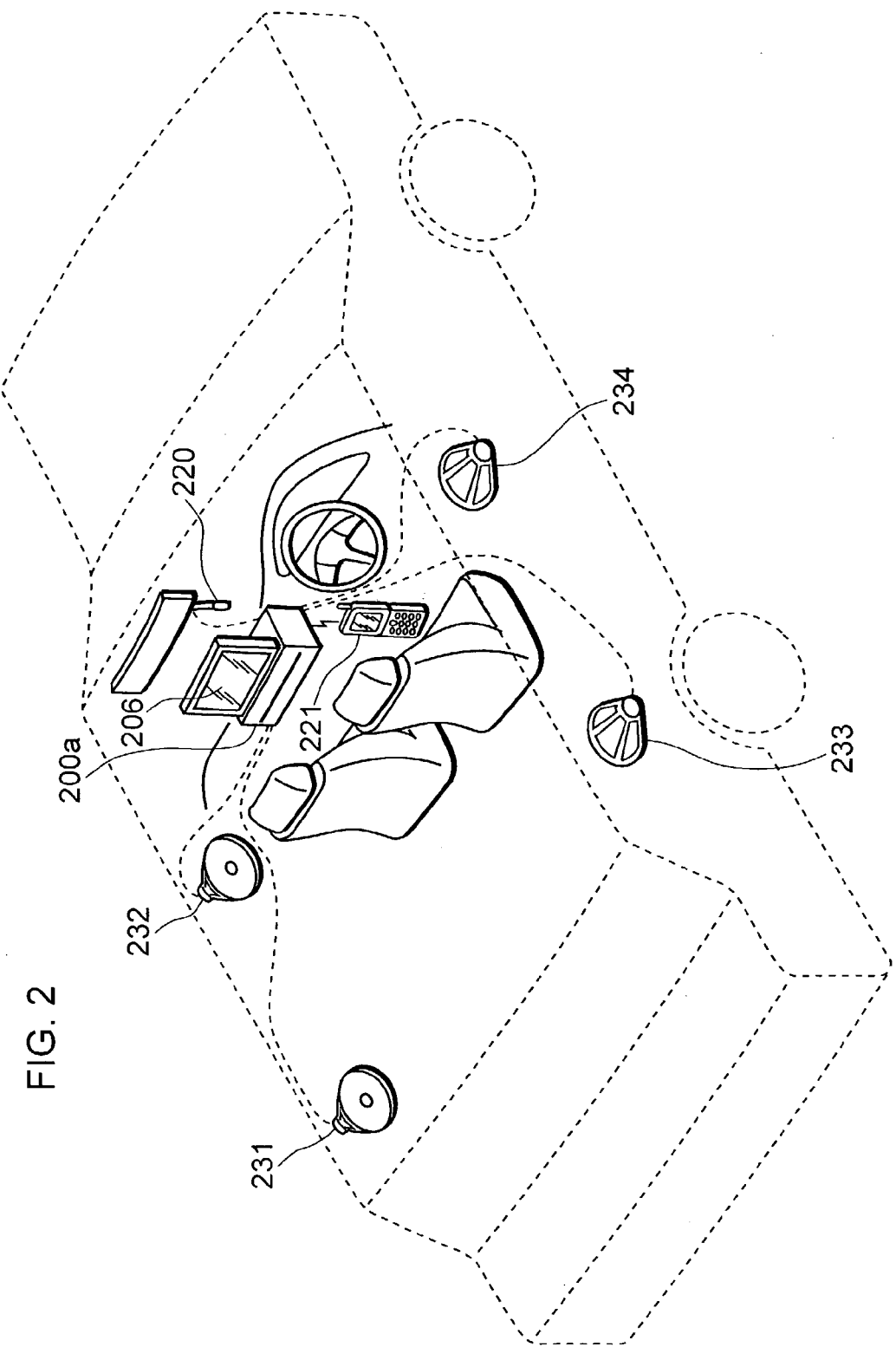
FIG. 2 is an external view of a communication device for the first embodiment according to the present invention.

FIG. 2 is an external view of the communication device according to the first embodiment of the present invention.

This communication device 200 is a device for reducing a user's nuisances in a situation where the user moves into an area in a poor communication status such as tunnels and mountains. The communication device 200 is installed in/to an automobile and structured as a hands-free device containing a car navigation system function. That is to say, this communication device 200 obtains Global Positioning System (GPS) data indicating a position and the like from a GPS satellite, navigates the user who drives the automobile to his destination, and additionally enables the user to communicate through a portable telephone 221 without having him hold the portable telephone 221 in his hand (hands-free communication).

This type of communication device 200 comprises a main body 200a embodied in a front panel, a console box or the like within the automobile, a microphone 220 which collects the driver's voice and is installed at a rearview mirror or somewhere in the automobile, four speakers 231–234 which are located to transmit sounds widely in the automobile, and a portable telephone 221 which is brought into the automobile and communicates with the main body 200a.

Figure 3:
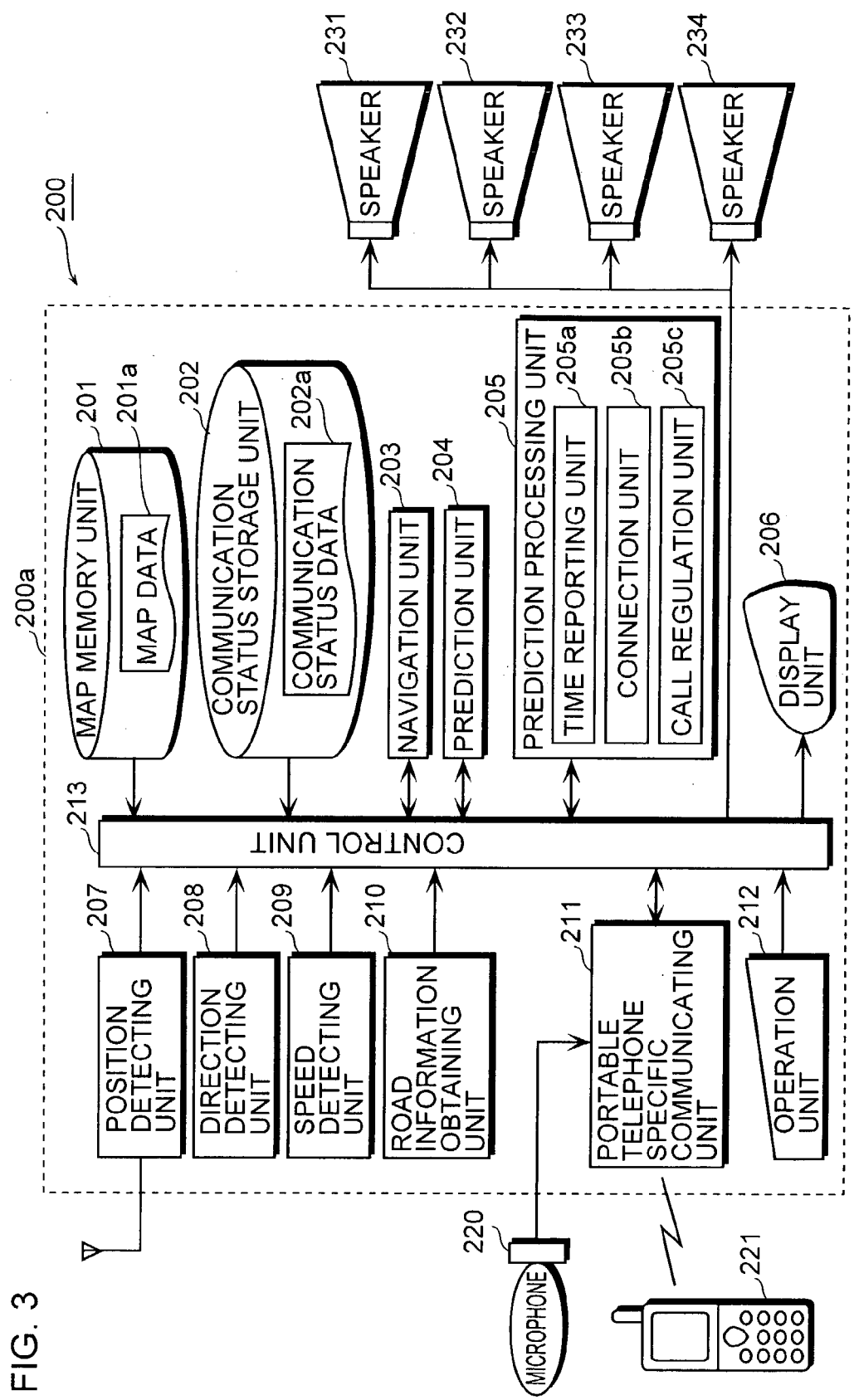
FIG. 3 is a block diagram to show a structure of the communication device according to the first embodiment.

FIG. 3 is a block diagram to show a structure of the communication device 200 according to the first embodiment.

The main body 200a of the communication device 200 includes the following elements: a position detecting unit 207 that obtains the above GPS data from the GPS satellite and detects its own position (i.e., the current position of the automobile in which the communication device 200 is installed) based on the GPS data; a map memory unit 201 that pre-memorizes map data 201a indicating a map; an operation unit 212 that contains operating buttons or the like to enter, for instance, an automobile's goal (destination), and outputs an operation entered signal according to operations through the operating buttons; a navigation unit 203 that generates navigation data including information which is necessary to navigate the user from the position detected by the position detecting unit 207 to the destination; a display unit 206 that displays a graphic, a character or the like such as a map of a surrounding area; a road information obtaining unit 210 that obtains road traffic information such as through a Vehicle Information and Communication System (VICS); and a control unit 213 that controls the above position detecting unit 207 and navigation unit 203 according to the operation signal outputted from the operation unit 212, makes the display unit 206 display a map containing the current position and its surrounding area and a route to the destination or the like, and makes the speakers 231–234 output a guiding voice or the like. While the map memory unit 201 may be embodied as ROM (Read Only Memory), RAM (Random Access Memory) or the like, the control unit 213 is structured as CPU (Central Processing Unit) or the like.

The position detecting unit 207 obtains the GPS data, detects its own position such as "135° 25' 30 east longitude, 40 ° 30' 25" north latitude", generates detected position information indicating the detected position, and outputs the generated detected position information to the control unit 213.

The road information obtaining unit 210 obtains the road traffic information distributed from a VICS center via a beacon, etc. located on a road. This road traffic information contains content that informs the user of traffic conditions of the road the automobile is currently driving and of its surrounding roads.

The navigation unit 203 obtains the detected position information generated by the position detecting unit 207 according to an instruction from the control unit 213, recognizes the destination entered from the operation unit 212 via the control unit 213, and reads out the map data 201a from the map memory unit 201 which contains the area from the position indicated in the detected position information to the destination. Then, the navigation unit 203 searches a route from the position indicated in the detected position information to the destination. At this point, the navigation unit 203 obtains road traffic information from the road information obtaining unit 210 via the control unit 213 and searches the route to reach the destination in a quickest way or in a shortest distance along with consideration of traffic conditions, etc. indicated in the road traffic information. Then, the navigation unit 203 outputs the searched route and navigation data indicating the current position of the automobile on the map to the control unit 213.

The control unit 213 makes the display unit 206 display the map containing the current position of the automobile and its neighborhood (surrounding area) with the searched route according to the navigation data obtained from the navigation unit 203, and makes the speakers 231–234 output the guiding voice, for example, "Please turn left at a next crossing".

In this way, the communication device 200 operates as a terminal of a car navigation system because the communication device 200 includes the aforementioned navigation unit 203 or the like, and navigates the user as a driver to his destination. Also, because the main body 200a contains the road information obtaining unit 210, the communication device 200 can search the most appropriate route along with consideration of traffic conditions.

In addition, the main body 200a of this communication device 200 includes a portable telephone specific communicating unit 211. When a telephone line is connected between the portable telephone 221 and another telephone, the portable telephone specific communicating unit 211 obtains, through the communication with the portable telephone 221, a sound signal indicating a voice of the driver from the microphone 220, sends the sound signal to the other telephone via the portable telephone 221, and obtains, via the portable telephone 221, a sound signal indicating a voice of the calling party sent from the other telephone.

This portable telephone specific communicating unit 211 communicates with the portable telephone 221 according to a communication standard of, for example, Bluetooth (a trademark of Bluetooth SIG Incorporated).

When the control unit 213 obtains the operation signal that instructs to make a call to the other telephone with a specific telephone number from the operation unit 212, the control unit 213 makes the portable telephone specific communicating unit 211 communicate with the portable telephone 221 to make the call from the portable telephone 221 to the other telephone. When the telephone line is connected between the portable telephone 221 and the other telephone, the control unit 213 makes the driver's voice collected through the microphone 220 be output from the other telephone, and makes the calling party's voice be output from the speakers 231–234 based on the calling party's sound signal from the other telephone.

According to this, when the driver brings his portable telephone 221 into the automobile, he can make telephone calls with the portable telephone 221 without holding the portable telephone 221 in his hand.

Moreover, the main body 200a in the first embodiment contains the following elements: a direction detecting unit 208 that specifies a driving direction of the automobile by detecting directions of geomagnetic fields (east/west/south/north) and outputs direction information indicating its driving direction; a speed detecting unit 209 that detects a wheel rotation speed of the automobile and outputs speed information indicating a driving speed of the automobile; a communication status storage unit 202 that stores communication status data 202a indicating a communication status at each position on the map; a prediction unit 204 that estimates its own position (i.e., the position of the automobile in which the communication device 200 is installed) after a specific time based on the detected position information, direction information and speed information, and predicts the communication status at the estimated position with reference to the communication status data 202a; and a prediction processing unit 205 that executes each process such as a communication connecting process based on the predicted results by the prediction unit 204. The speed detecting unit 209 may also detect the driving speed of the automobile by detecting an automobile speed pulse. The prediction processing unit 205 is equipped with a time reporting unit 205a, a connecting unit 205b and a call regulation unit 205c, which are described later. Here, the communication status storage unit 202 is constructed as a ROM (Read Only Memory) or RAM (Random Access Memory) and the like, while the prediction unit 204 and prediction processing unit 205 are structured as a CPU (Central Processing Unit), etc.

FIG. 4 is a data content diagram to show the content of the communication status data 202a.

As shown in FIG. 4, the communication status data 202a has a position information field A1 and a communication level field A2. Position information to show each position, for example "longitude X1, latitude Y1" or "longitude X2, latitude Y2", is registered in the position information field A1, and a communication level at each position indicated in the position information is registered in the communication level field A2. This communication level describes the communication status with 10 levels, for example, starting from the communication level "1" as the worst communication status to "10" as the best communication status. For instance, in the communication status data 202a shown in FIG. 4, the position of "longitude X1, latitude Y1" is registered to be the worst communication status, while the position of "longitude X3, latitude Y3" is registered to be the best communication status.

Figure 5:
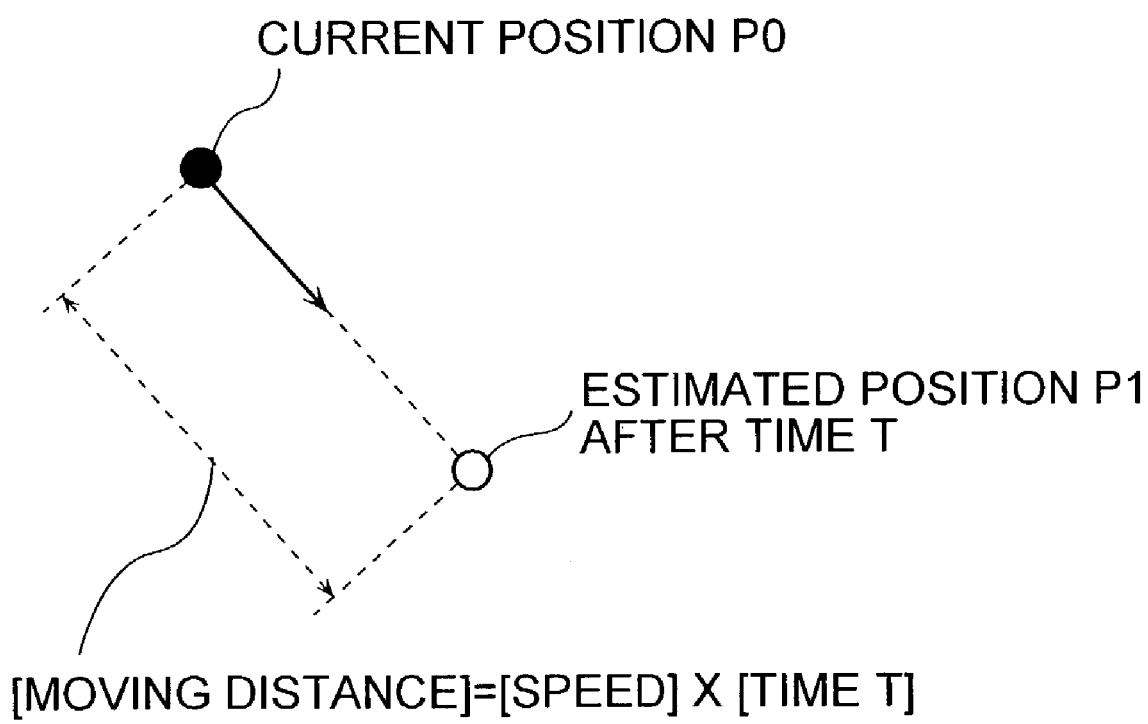
FIG. 5 is an explanatory diagram to describe a method for a prediction unit to estimate its own position after a specific time.

FIG. 5 shows an explanatory diagram that describes a method for the prediction unit 204 to estimate its own position (i.e., the position of the automobile n which the communication device 200 is installed) after a specific time.

For example, if the automobile catering this communication device 200 is currently at a position P0 and is driving in a south-east direction indicated with a solid arrow line in FIG. 5 at approx. 40 km/hr, the position detecting unit 207 detects that the automobile is at the position P0 and outputs the detected position information indicating the detected result. Also, at this point, the direction detecting unit 208 detects that the automobile is facing towards the south-east direction and outputs the direction information indicating the detected result. The speed detecting unit 209 detects that the driving speed of the automobile is at approx. 40 km/hr and outputs the speed information indicating the detected result.

Once the prediction unit 204 obtains the above detected position information, direction information and speed information, the prediction unit 204 estimates that the automobile after a minute is going to be at position P1 for a driving distance of 40×1/60 km from the position P0 to the south-east direction.

Then, the prediction unit 204 searches for the position information indicating the position P1 from the communication status data 202a memorized in the communication status storage unit 202, and reads out the communication level at the position P1. For example, if the position P1 is "longitude X2, latitude Y2", the prediction unit 204 reads out the communication level "9" corresponding to the position information indicating "longitude X2, latitude Y2" from the communication status data 202a, and predicts the communication level after the minutes will be "9".

In this way, the prediction unit 204 predicts the communication level after a specific time. For example, the prediction unit 204 predicts the communication level after a minute, 2 minutes, 3 minutes . . . and so on.

Also, when the route to the destination is searched by the navigation unit 203 and the control unit 213 is navigating to the destination with the display unit 206 and speakers 231–234 based on the navigation data, the prediction unit 204 estimates the position of the automobile after a specific time based on the searched route.

Figure 6:
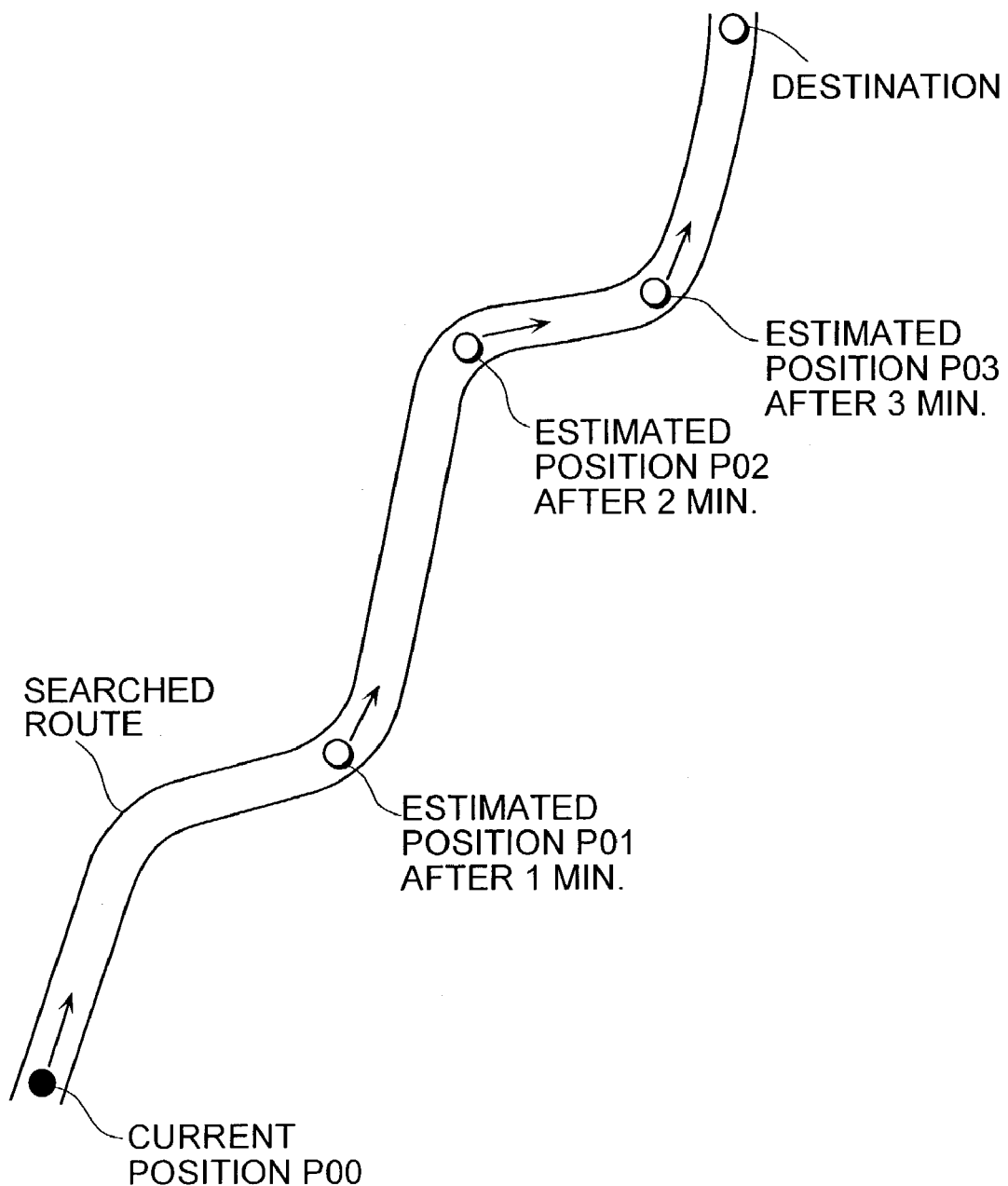
FIG. 6 is an explanatory diagram to describe a method for the prediction unit to estimate its own position after a specific time period according to a searched route.

FIG. 6 is an explanatory diagram that describes a method for the prediction unit 204 to estimate its own position (i.e., the position of the automobile in which the communication device 200 is installed) after a specific time based on the searched route.

The prediction unit 204 recognizes the position of the automobile on the searched route from the detected position information, and estimates the position of the automobile after a specific time along with the searched route based on the speed information. For example, as shown in FIG. 6, the prediction unit 204 estimates, according to the driving speed at the current position P00 on the searched route, that the automobile will be located at position P01 after a minute, at position P02 after 2 minutes and at position P03 after 3 minutes on the searched route.

Here, when estimating the position of the automobile after a specific time, the prediction unit 204 takes account of the road traffic information obtained by the road traffic information obtaining unit 210. Namely, when the obtained road traffic information indicates that the traffic ahead of the automobile on the searched route is busier than the current position, the prediction unit 204 estimates the position of the automobile after a specific time, assuming that the automobile will drive slower (for example, at 20 km/hr) than the current speed (for example, at 40 km/hr) in the busy area. Also, if the obtained road traffic information indicates that the road ahead on the searched route has less traffic than the current position, the prediction unit 204 estimates the position of the automobile after a specific time, assuming that the automobile will drive faster (for example, 60 km/hr) than the current speed (for example, 40 km/hr) in that area. By using the road traffic information in this way, the prediction unit 204 can estimate the position of the automobile more accurately and predict the communication level more precisely.

Moreover, the map data 201a memorized in the map memory unit 201 contains information related to a speed limit for each road (speed limit information). Then, the prediction unit 204 takes account of the speed limit information contained in the map data 201a when estimating the position of the automobile after a specific time. That is to say, in the above example, even though the automobile currently driving at 40 km/hr is presumed to drive at 60 km/hr on the road ahead according to the road traffic information, the prediction unit 204 estimates the position of the automobile after the specific time along with consideration of the speed limit information. Therefore, if the speed limit on the road ahead indicates 50 km/hr in the speed limit information, the prediction unit 204 actually assumes that the driving speed of the automobile will be 50 km/hr and estimates the position of the automobile after the specific time. By using the speed limit information in this way, the prediction unit 204 can estimate the position of the automobile more accurately and predict the communication level more precisely.

The prediction unit 204 predicts the above type of the communication level for each specific time duration or by each specific distance based on the latest detection result output from the position detecting unit 207, the direction detecting unit 208 and the speed detecting unit 209. It is also possible that the prediction unit 204 handles its prediction according to changes in the communication status. When there are radical fluctuations in the communication status, the prediction unit 204 may be made to predict the communication level frequently.

Although the prediction unit 204 in the above case predicts the future communication level in every minute interval like "after one minute", "after two minutes", "after three minutes", and so on, its time interval is not limited to every minute, and the time interval may be different, such as "every 10 seconds". The time interval, as mentioned above, may be longer or shorter according to changes in the communication status.

The prediction processing unit 205 includes the time reporting unit 205a that reports to the user and his calling party the time allowed for communication based on the communication level predicted by the prediction unit 204, a connection unit 205b that instructs the control unit 213 to conduct a connection process via the telephone line between the portable telephone 221 and the other telephone for the automobile going through the area in the poor communication status, and a call regulation unit 205c that regulates incoming and outgoing calls of the portable telephone 221 when the automobile goes through the area in the good communication status just for a short period within the area in the poor communication status.

In a situation where a telephone line is connected between the portable telephone 221 and the other telephone and the driver is talking through the hands-free function, if the line is judged to be disconnected because the automobile will reach the area in the bad communication status after a specific time, the time reporting unit 205a informs the user and his calling party of the calling time (the time allowed for call) allowed until the automobile reaches that area. For example, if the prediction unit 204 predicts the communication level will be "9" after a minute, "8" after 2 minutes, "5" after 3 minutes and "1" after 4 minutes, the time reporting unit 205a decides that the automobile will reach the area in the poor communication status after 4 minutes and the line will be disconnected according to the prediction result of the communication level. Then, through the control unit 213, the time reporting unit 205a makes the display unit 206 display characters such as "The line will be disconnected after 4 minutes", and speakers 231–234 output an announcement such as "The line will be disconnected after 4 minutes due to the deteriorating communication status" by superimposing the announcement on the voice of the calling party on the phone. Furthermore, the time reporting unit 205a sends the reporting signal indicating the above announcement or the like to the portable telephone specific communicating unit 211, and makes the portable telephone specific communicating unit 211 send the reporting signal to the telephone of the calling party from the portable telephone 221. As a result, the above announcement which is superimposed on the driver's voice is output from the telephone of the calling party.

In this way, the communication device 200 of the first embodiment can avoid a sudden disconnection of the line so that the driver who makes a hands-free call and his calling party can recognize in advance when the line is disconnected.

Additionally, in a situation where a telephone line is connected between the portable telephone 221 and the other telephone and the driver is talking through the hands-free function, when the line is decided to be disconnected because the automobile will reach the area in the poor communication status after a specific time, and subsequently to be connected after the automobile gets out from the area according to the prediction result by the prediction unit 204, the time reporting unit 205a informs the user and his calling party about the time allowed for their communication as well as the time required to be re-connectable (time required for reconnection).

For example, as stated above, suppose the communication level is predicted to be "5" after 3 minutes, "1" after 4 minutes and "2" after 10 minutes. Based on such prediction result, the time reporting unit 205a decides that the line will be disconnected after 4 minutes when the automobile reaches the area in the poor communication status, and that the line can be reconnected after 10 minutes when the automobile gets out from the area in the bad communication status. Then, the time reporting unit 205a reports the time allowed for communication as described above, and makes, through the control unit 213, the display unit 206 display characters such as "Reconnection is possible after 10 minutes" and the speakers 231–234 output announcements such as "Reconnection is possible after 10 minutes" by superimposing the announcement on the voice of the calling party on the phone. Moreover, the time reporting unit 205a sends the reporting signal indicating the above-described announcement to the portable telephone specific communicating unit 211 via the control unit 213, and has the portable telephone specific communicating unit 211 send the reporting signal from the portable telephone 221 to the telephone of the calling party. As a result, the above announcement, which is superimposed on the voice of the driver, is output from the telephone of the calling party.

In this way, the communication device 200 in the first embodiment enables the driver who is on the hands-free phone and his calling party to know the time required for reconnection so as to reduce annoyance of the user and makes it easier to handle the reconnection.

Figure 7:
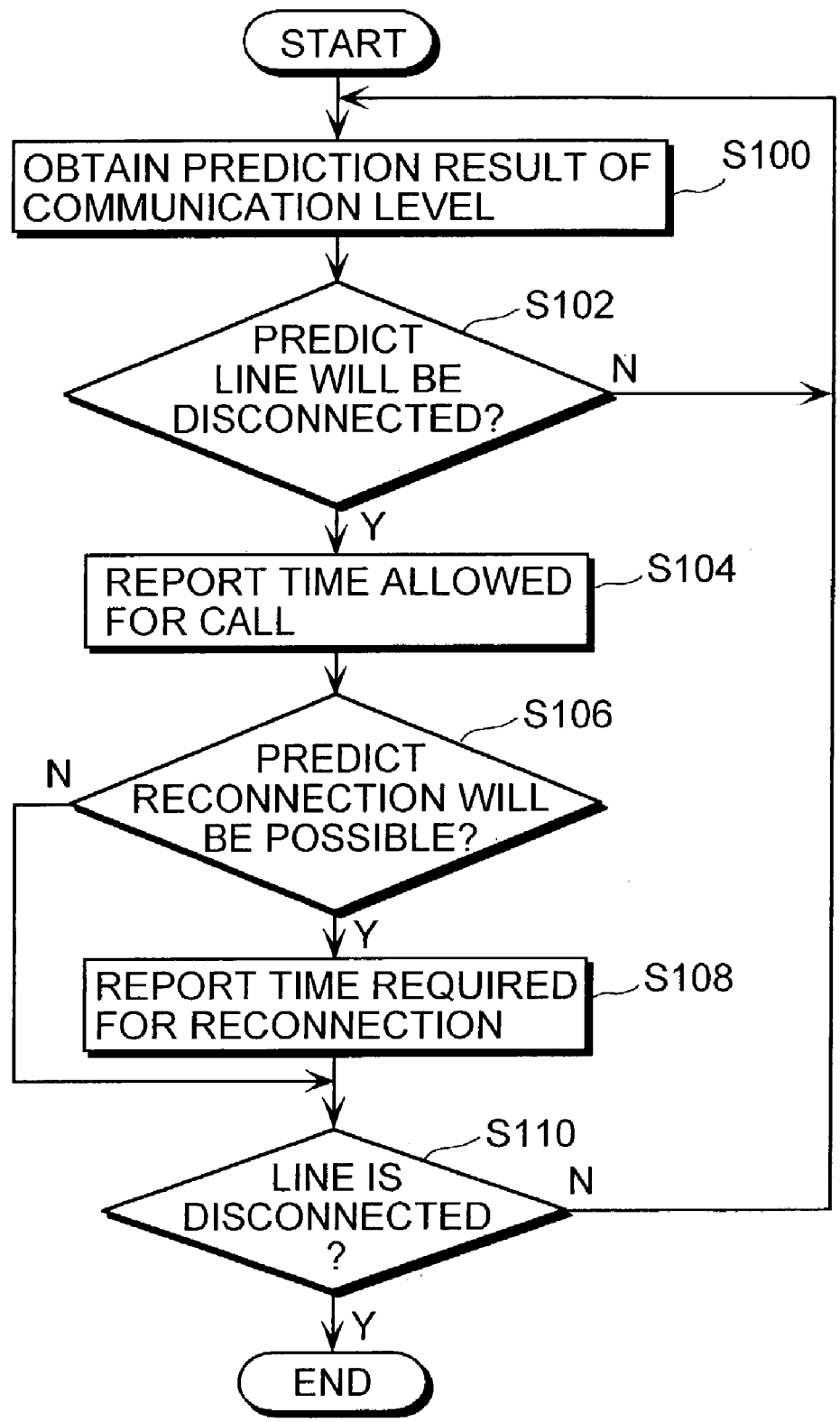
FIG. 7 is an action flow diagram to show a series of actions taken by a time reporting unit.

Here, with reference to FIG. 7, the following describes a series of actions taken by the above-described time reporting unit 205a of the prediction processing unit 205.

FIG. 7 is an action flow diagram to show a series of action taken by the time reporting unit 205a in a situation where a telephone line is connected between the portable telephone 221 and the other telephone.

At first, the time reporting unit 205a obtains a prediction result of the communication level from the prediction unit 204 (Step S100). Then, the time reporting unit 205a predicts whether or not the line will be disconnected according to the prediction result (Step 5102). If the time reporting unit 205a predicts that the line will be disconnected after 5 minutes (Y in the Step S102), the time reporting unit 205a reports the time allowed for communication (5 minutes) to the user and his calling party by using the display unit 206 and the speakers 231–234 (Step S104). If the time reporting unit 205a predicts the line will not be disconnected within a specific time in the Step S102 (N in Step S102), the time reporting unit 205a repeats obtaining the latest prediction result from prediction unit 204 and repeats actions from the Step S100.

Additionally, when the time reporting unit 205a predicts the line will be disconnected in Step S102, the time reporting unit 205a further predicts whether or not the line can be re-connected within a specific time based on the prediction result of the communication level obtained by the prediction unit 204 (Step S106). As its result, if the time reporting unit 205a predicts the line can be reconnected after 9 minutes (Y in the Step S106), the time reporting unit 205a reports the time required for reconnection (9 minutes) to the user and his calling party by using the display unit 206 and speakers 231–234 (Step S108). Then, the time reporting unit 205a terminates the process when it recognizes the actual disconnection of the line (Y in the Step S110). If the line is not disconnected (N in the Step 5110), the time reporting unit 205a repeats the actions from Step S100 again.

As a result, announcements, such as "The line will be disconnected after 5 minutes due to the poor communication status" and "Reconnection is possible after 9 minutes", and then a minute later, "The line will be disconnected after 4 minutes due to a poor communication status" and "Reconnection is possible after 8 minutes" and so on, are output repeatedly from the speakers 231–234 and the telephone of the calling party until the line is disconnected.

Moreover, when reconnection is predicted to be impossible within a specific time in Step S106 (N in Step S106), the time reporting unit 205a executes actions from the Step S110 without informing the time required for reconnection.

In this way, when the line is connected between the portable telephone 221 and the other telephone, the time reporting unit 205a repeats actions from Step S100 to Step 5110, and informs the user and his calling party of the time allowed for communication and the time required for reconnection every time the prediction result of the latest communication level is obtained from the prediction unit 204.

On the other hand, when the driver is making a hands-free call by connecting the telephone line between the portable telephone 221 and the other telephone, the connection unit 205b of the prediction processing unit 205 in the first embodiment decides whether or not the line will be disconnected shortly according to the prediction result by the prediction unit 204. As a result, if the line is predicted to be disconnected soon, the connection unit 205b instructs the control unit 213 to inform the connection unit 205b of the telephone number of the telephone that is currently connected to the portable telephone 221 through the telephone line in order to reconnect the line after the disconnection. The control unit 213 receiving such instruction obtains the telephone number of the above telephone currently on line with the portable telephone 221 via the portable telephone specific communicating unit 211, and informs the telephone number to the connection unit 205b. Then, the connection unit 205b holds the telephone number informed.

Additionally, as mentioned above, when the connection unit 205b decides the line will be disconnected soon, the connection unit 205b makes the display unit 206 display characters indicating the termination of the communication such as "The communication is terminated due to a deteriorating communication status", and the speakers 231–234 output a similar type of announcement indicating the communication termination by superimposing the announcement on the voice of the calling party. Furthermore, the connection unit 205b makes the reporting signal indicating the above announcement sent from the portable telephone 221 be received by the telephone of the calling party. As a result, the telephone of the calling party outputs the announcement indicating the above communication termination by superimposing the announcement on the voice of the driver.

Then, the connection unit 205b further instructs the control unit 213 to automatically terminate the communication.

The control unit 213 receiving such instruction of the automatic termination puts the portable telephone 221 on the hook (i.e., disconnects) by controlling the portable telephone specific communicating unit 211. As a result, the communication between the portable telephone 221 and the telephone is normally terminated.

After the communication is terminated, the connection unit 205b obtains the detected position information from the position detecting unit 207, and repeats to read out the communication level corresponding to the position indicated in the detected position information from the communication status data 202a. That is to say, the connection unit 205b obtains the communication level at the current position. Then, the connection unit 205b decides whether or not reconnection is currently possible. If reconnection is decided to be possible, the connection unit 205b, instead of the operation unit 212, informs the telephone number held before the communication termination to the control unit 213, and sends a reconnection signal, which instructs to call the telephone of the telephone number, to the control unit 213. As a result, the control unit 213 has the portable telephone 221 call the telephone of the telephone number via the portable telephone specific communicating unit 211, and makes the telephone line be reconnected between the portable telephone 221 and the other telephone.

In this way, since the communication termination due to a deteriorating communication status is pre-informed, it is possible in the communication device 200 of the first embodiment to prevent the communication from being disconnected suddenly. Also, the communication device 200 eliminates troublesome operations for the user and makes a disconnection easy to handle because the communication device 200 can automatically terminate communication and reconnect the line without relying on the user's operation when the communication status gets better. That is to say, through the announcement made by the above-described time reporting unit 205a, or even when the user tries to continue his call without terminating the communication manually, the communication device 200 automatically terminates and reconnects the communication line as described above so as to further eliminate annoyance on the part of the user.

Figure 8:
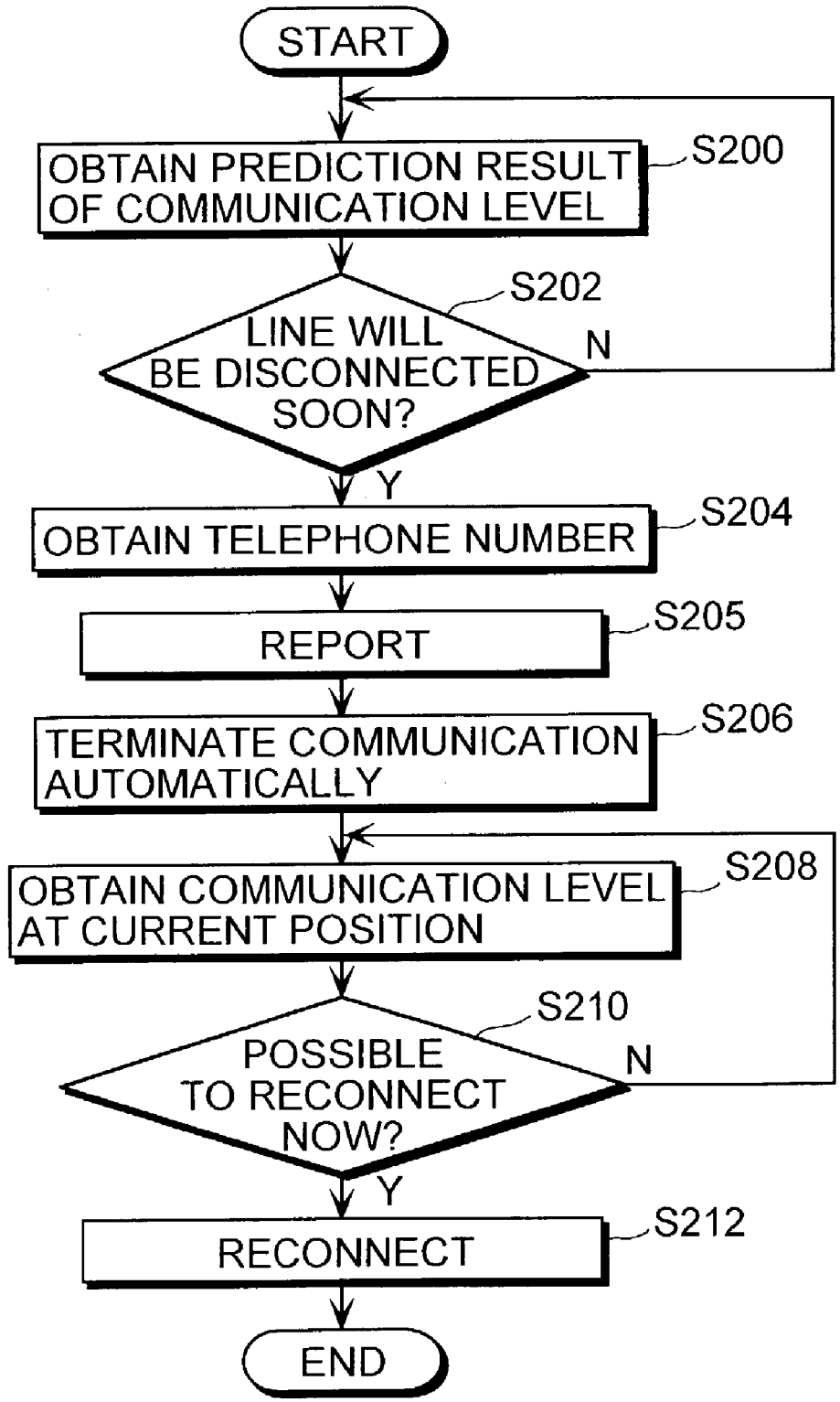
FIG. 8 is an action flow diagram to show a series of actions taken by a connecting unit.

The following describes a series of actions taken by the connection unit 205b in the prediction processing unit 205 with reference to FIG. 8.

FIG. 8 is an action flow diagram to show a series of actions taken by the connection unit 205b.

At first, the connection unit 205b obtains a prediction result of the communication level from the prediction unit 204 (Step S200). Then, the connection unit 205b predicts whether or not the line will be disconnected in the near future based on the prediction result (Step S202). For example, if the line is predicted to be disconnected after one minute (Y in Step S102), the connection unit 205b obtains a telephone number of the telephone of the calling party and retains the obtained telephone number (Step S204). Then, it informs the user and his calling party of the termination of the communication (Step S205). After it is informed, it terminates the communication automatically (Step S206).

Then, the connection unit 205b obtains the communication level at the current position from the communication status data 202a (Step S208), and decides whether or not it can reconnect the line currently (Step S210). If the communication unit 205b decides that the reconnection is possible at this point (Y in Step S210), the connection unit 205b informs the telephone number retained in Step S204 to the control unit 213 and reconnects the telephone to the portable telephone 221 (Step S212). If the communication unit 205b decides the reconnection is impossible (N in Step S210), the connection unit 205b obtains the communication level at the current position once again and repeats the actions from Step S208.

In steps S208 and S210 for the above example, the connection unit 205b decides whether or not the reconnection is possible based on the communication level of the communication status data 202a, but its decision can also be made, for example, based on a measurement result of a radio wave intensity of the portable telephone 221.

Although the connection unit 205b obtains the telephone number in Step S204, the connection unit 205b can obtain the telephone number of the calling party, for example, through a caller's ID notification service when receiving an incoming call or through the telephone number when making an outgoing call and can memorize the telephone number.

Also, the call regulation unit 205c of the prediction processing unit 205 regulates incoming and outgoing calls of the portable telephone 221 even at a place in the good communication status if the automobile goes through the place in the good communication status only for a short time within an area in the bad communication status. In this way, the user's nuisances can be lightened because any calls that may be disconnected briefly are prohibited.

Figure 9:
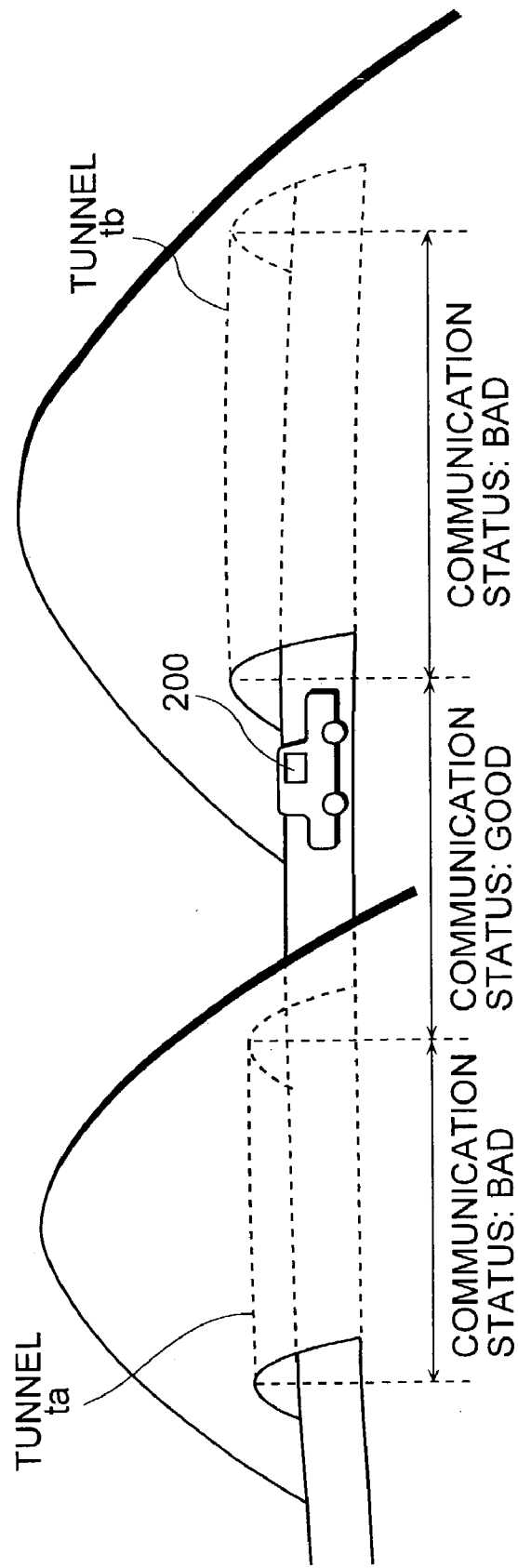
FIG. 9 is an explanatory diagram to describe how automobile drives through two tunnels.

As stated above, the following describes an example of the automobile which goes through the place in a good communication status just for a short time within a location in a bad communication status with reference to FIG. 9.

FIG. 9 is an explanatory diagram to explain how the automobile goes through two tunnels.

As indicated in FIG. 9, two tunnels ta and tb are located close to each other on a road. Also, the communication status is inferior in both tunnels ta and tb, but the communication status is good at the place between the tunnels ta and tb. Therefore, when the automobile drives on such a road from the tunnel ta to the tunnel tb, the automobile is in a good communication status just for a little while when the automobile goes through the place between the tunnels ta and tb.

Then, in a situation where the automobile is driving in a bad communication status, for example, when the automobile is driving in the tunnel ta in FIG. 9, and the telephone line is not being connected between the portable telephone 221 and the other telephone, the call regulation unit 205c decides whether or not the automobile will reach the place in the good communication status and the line can be connected within a specific time from the prediction result of the communication level from the prediction unit 204, and the call regulation unit 205c further decides whether or not the time allowed for the line connection is shorter than a specific time (i.e., the minimum calling time). If the time allowed for line connection is decided to be shorter than the minimum calling time, and when the automobile is actually traveling at the place in the good communication status, the call regulation unit 205c outputs a regulation signal to the control unit 213, which instructs to respectively nullify: an outgoing call operation signal, which instructs to make an outgoing call to the other telephone, output from the operation unit 212 to the control unit 213; and an incoming call notification signal, which informs an incoming call from the other telephone, output from the portable telephone 221 to the control unit 213 via the portable telephone specific communicating unit 211.

Also, if the call regulation unit 205c is informed of a receipt of the above-described outgoing call operation signal from the control unit 213 when the regulation signal is output, the call regulation unit 205c informs the user that the operation is nullified, i.e., the outgoing call is regulated, through the display unit 206 and the speakers 213–234. Further, if the call regulation unit 205c is informed of a receipt of the above-described incoming call notification signal from the control unit 213 when the regulation signal is output, the call regulation unit 205c makes the control unit 213 control the portable telephone specific communicating unit 211 and the portable telephone 221, and makes the speaker of the other telephone, which is making the outgoing call to the portable telephone 221, output a message for the user of the other telephone that the regulation for the incoming calls are regulated at the communication device 200 side.

Figure 10:
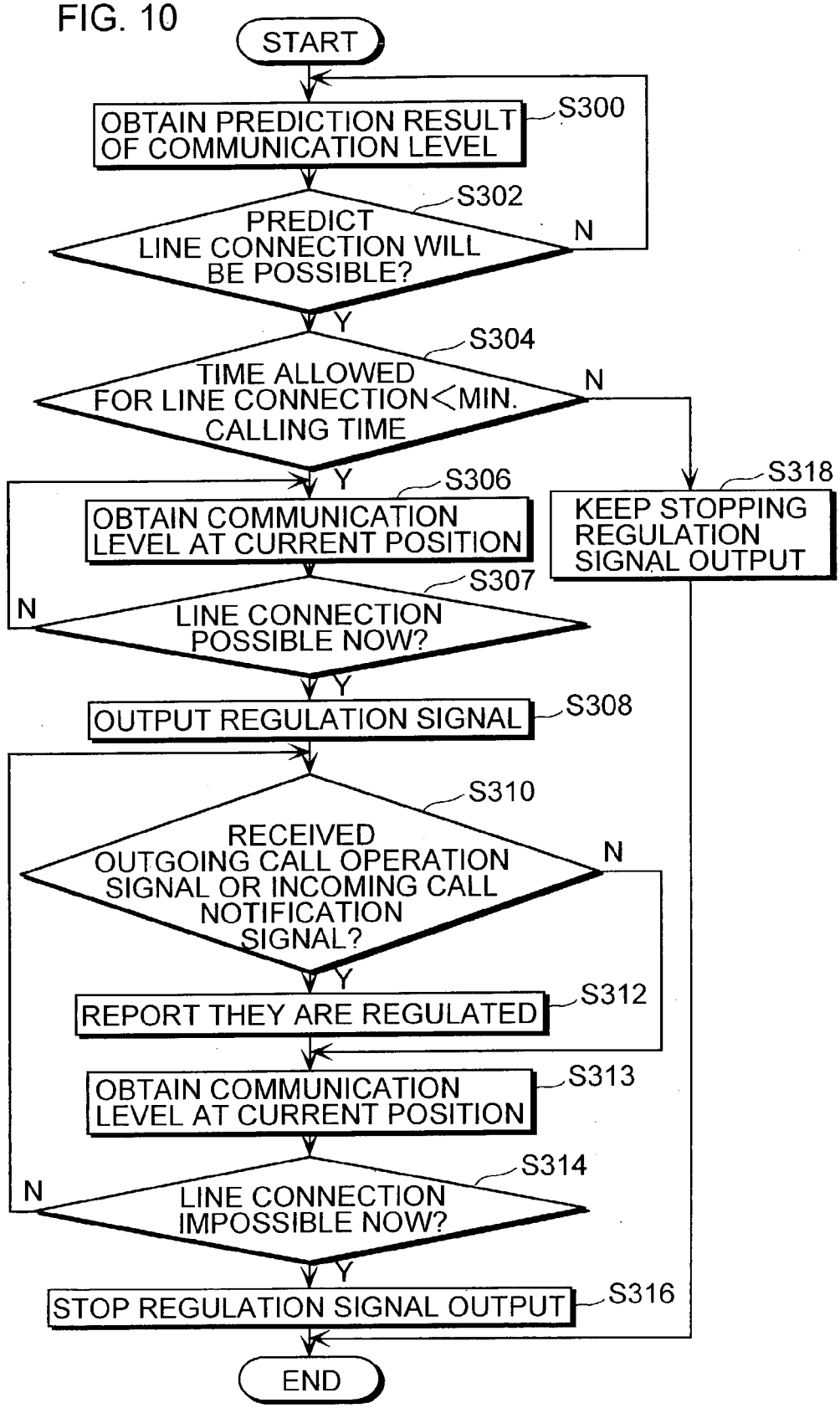
FIG. 10 is an action flow diagram to show a sample action taken by a call regulation unit.

The following describes an example of actions of the call regulation unit 205c of the prediction processing unit 205 with reference to FIG. 10.

FIG. 10 is an action flow diagram to show the example of actions taken by the call regulation unit 205c in a situation where the automobile is driving in the area in the bad communication status and the telephone line is not connected between the portable telephone 221 and the other telephone.

First, the call regulation unit 205c obtains a prediction result of the communication level from the prediction unit 204 (Step S300). Then, the call regulation unit 205c predicts whether or not the line connection is possible based on the prediction result (Step S302). If the call regulation unit 205c predicts that the line connection is possible (Y in Step S302), the call regulation unit 205c decides whether or not the time allowed for the line connection is shorter than the minimum calling time (Step S304). If the call regulation unit 205c predicts that the line connection is impossible (N in Step S302), the call regulation unit 205c obtains the prediction result of the latest communication level once again and repeats the actions from Step S300.

When the time allowed for line connection is decided to be shorter than the minimum calling time in the Step S304 (Y in Step S304), the call regulation unit 205c obtains the communication level at the current position by obtaining the detected position information from the position detecting unit 207 and reading out the communication level corresponding to the position indicated in the detected position information from the communication status data 202a (Step S306). Then, the call regulation unit 205c decides whether or not the line can be connected currently (Step S307).

If the line connection is decided to be currently possible (Y in Step S307), the call regulation unit 205c outputs a regulation signal to the control unit 213 (Step S308). By doing so, the outgoing call operation signal from the operation unit 212 and the incoming call notification signal from the portable telephone 221 are nullified in the control unit 213. This results in regulating outgoing and incoming calls for the portable telephone 221. Also, if the line connection is decided to be currently impossible (N in Step S307), the connection unit 205b obtains the communication level at the current location once again and repeats the actions from Step S306.

Next, when the regulation signal is output, the call regulation unit 205c decides whether or not the outgoing call operation signal or the incoming call notification signal is received by the control unit 213 based on the notification from the control unit 213 (Step S310). Then, if the call regulation unit 205c decides the outgoing call operation signal or the incoming call notification signal is received by the control unit 213 (Y in Step S310), the call regulation unit 205c informs the user of the communication device 200 and the user of the other telephone, which is calling the portable telephone 221, of the incoming and outgoing call regulation as stated above (Step 5312).

Subsequently, the call regulation unit 205c obtains the communication level at the current position in the same way as in Step S306 (Step S313), and decides whether or not the line can be connected currently (Step S314). When the line connection is decided to be impossible at this point (Y in Step S314), the call regulation unit 205c stops the regulation signal output (Step S316). If the line connection is decided to be possible (N in Step S314), the call regulation unit 205c repeats the actions from Step S310. Also, in the Step S310, if the call regulation unit 205c decides the outgoing call operation signal or the incoming call notification signal is not received by the control unit 213 (N in Step S310), the call regulation unit 205c executes the steps from Step S313 without making the notification in Step S312.

If the time allowed for line connection is the same as the minimum calling time or longer (N in Step S304), the call regulation unit 205c maintains the status to stop regulation signal output (Step S318).

FIG. 11A is a screen display diagram to show an example of a screen displayed on the display unit 206 when the call regulation unit 205c informs the regulation of outgoing calls to the user in the Step S312.

As shown in this FIG. 11A, messages describing "You cannot make a call because communication status gets worse shortly" and "Predicted time allowed for call: 1 minute" and a release button shown as "Release regulation" are displayed in the display unit 206.

These messages and the release button are displayed by the call regulation unit 205c making the control unit 213 control the display unit 206. Also, the time displayed in the message of "Predicted time allowed for call: 1 minute" ("1 minute" in this example) depends on the time allowed for line connection decided by the call regulation unit 205c in Step S304 and on the time when the user performs the outgoing call operation. For example, if the time allowed for line connection is decided to be two minutes in step S304, and the user performs the outgoing call operation one minute after the decision that the line connection is possible in Step 307, "Predicted time allowed for call: 1 minute" is displayed as indicated in FIG. 11A. If the user performs the outgoing call operation one and a half minutes after the decision that the line connection is possible in Step S307, "Predicted time allowed for call: 30 seconds" is displayed.

If the user touches the release button displayed as "Release regulation", the call regulation unit 205c stops the regulation signal output. That is to say, the display unit 206 includes a function as a touching panel and is embodied in the same structure with the operation unit 212. The signal, which indicates activation of the release button, is obtained by the call regulation unit 205c from the display unit 206 via the control unit 213. As a result, because output of the regulation signal is stopped as described above, the control unit 213 treats the outgoing call operation signal from the operation unit 212 as being valid has and thereby causes the portable telephone 221 to make the outgoing call.

FIG. 11B is a screen display diagram to show an example of a screen displayed in the display unit 206 when the call regulation unit 205c informs the user of the incoming call regulation in Step S312.

As shown in FIG. 11B, messages such as "Receiving call, but cannot answer because communication status gets worse shortly" and "Predicted time allowed for call: 1 minute" and the release button indicated as "Release regulation" are displayed in the display unit 206.

As explained above with reference to FIG. 11A, these messages and the release button are displayed by the call regulation unit 205c making the control unit 213 control the display unit 206. Also, the time indicated in the message of "Predicted time allowed for call: 1 minute" (1 minute in the above example) depends on the time allowed for line connection decided by the call regulation unit 205c in Step S304 and the time when an incoming call is received. Also, if the user touches the release button indicated as "Release regulation", the call regulation unit 205c stops the regulation signal output. As a result, the control unit 213 treats the incoming call notification signal from the portable telephone 221 as being valid, and makes the portable telephone 221 receive the incoming call.

The following explains characteristic actions of the communication device 200 according to the first embodiment with reference to FIG. 12.

FIG. 12 is an action flow diagram to show characteristic actions of the communication device 200 installed in/to the automobile in a process where the automobile goes through the areas in the good and bad communication statuses.

First, when the automobile goes through the area in the good communication status, the communication device 200 connects the telephone line according to the user's operation (Step S400). As a result, the user starts a hands-free communication.

Next, when the automobile approaches the area in the bad communication status such as a tunnel, the communication device 200 predicts that the line will be disconnected (Step S402) and informs the time allowed for connection to the user and his calling party (Step S403). Then, when the communication device 200 predicts the line will be connectable once again after the line connection (Step S404), the communication device 200 informs the time that is required for re-connection to the user and his calling party (Step S405).

Moreover, when the automobile goes to an area just before the tunnel, the communication device 200 retains the telephone number of the calling party's telephone and informs of termination of the communication, and then automatically terminates the communication (Step S408).

When the automobile gets out from the tunnel and enters into the area in the good communication status, the communication device 200 reconnects the line to the telephone, which was connected before the tunnel (Step S410). In this way, the user can start his hands-free communication with the same calling party without operating the communication device 200. Also, if the user operates the communication device 200 to end the communication, the communication device 200 terminates the communication with the telephone of the calling party according to the operation (Step S412).

Next, when the automobile enters into a tunnel once again, the communication device 200 is not in a communicational status. Then, when the automobile approaches the end of the tunnel, the communication device 200 predicts that the line can be connectable soon. However, if there is another tunnel close to the current tunnel, the communication device 200 predicts that the time allowed for line connection is less than the minimum calling time (Step S414). Therefore, even if the automobile gets out from the first tunnel and reaches the area in the good communication status located right before the aforementioned second tunnel, the communication device 200 regulates incoming and outgoing calls (Step S416). By doing so, the user does not make a call that may be disconnected soon so as to reduce the user's nuisances.

Subsequently, once the automobile goes into the aforementioned second tunnel, the communication device 200 de-regulates the above regulation since the automobile is in the bad communication status (Step S418).

In this way, the communication device 200 of the first embodiment can lighten the user's annoyance even if the communication status is fluctuated by moving.

These are the explanations for the communication device related to the present invention with reference to the first embodiment, but the present invention is not limited to these.

For example, the position information may be registered in the communication status data 202a by using longitude and latitude in the first embodiment, but other descriptions such as an address may be used for its registration. Additionally, although the communication level is graded into 10 different levels and registered into the communication status data 202a, other descriptions including a temporal average value of a radio wave density may be used instead of the 10 level rating. Also, the first embodiment makes each of the time reporting unit 205a, the connection unit 205b and the call regulation unit 205c in the prediction processing unit 205 decide that the communication status gets worse and the line is disconnected when the communication level becomes "1", and that the line can be connected when the communication level becomes "2"or more. However, a threshold value of such communication level may be something other than "1". The above threshold value may also be changed by the user's operations of the operation unit 212.

Additionally, the communication device 200 in first embodiment is described as a hands-free device containing such a car navigation function, but the communication device 200 does not have to provide the car navigation function. That is to say, if there is a terminal for a car navigation system within the automobile, signals can be exchanged between the communication device 200 and the car navigation system. Alternatively, if there is no such car navigation system within the automobile, it is possible to apply the method indicated in FIG. 5, i.e. making the communication device 200 predict its position after a certain time all the time based on the position, moving speed and moving direction of the automobile (the communication device 200). By doing so, the communication device 200 does not need to carry the map memory unit 201 or the navigation unit 203 so that the communication device 200 can be kept in a compact size. Additionally, the road information obtaining unit 210 may be removed from the communication device 200. In such a case, if there is a device to obtain the road traffic information in the automobile, the communication device 200 may exchange signals with the device. In this way, the size of the communication device 200 may be further reduced. Additionally, the communication device 200 may be structured as a portable telephone or an automobile phone.

Also, in the first embodiment, the connection unit 205b of the prediction processing unit 205 automatically terminates the communication before the communication device 200 goes into the area in the bad communication status, but the communication may be terminated after the communication device 200 enters into the area in the bad communication status.

It is also possible to specify the moving direction of the communication device 200 based on changes in the position through a time passage detected by the position detecting unit 207, although a moving direction of the communication device 200 in the first embodiment is specified by making the direction detecting unit 208 detect the moving direction. In the same way as this, it is alternately possible to specify the moving speed of the communication device 200 based on changes in the moving speed through a time passage detected by the position detecting unit 207 rather than making the speed detecting unit 209 detect the moving speed of the communication device 200 through the circulation speed of the automobile's wheel as stated in the first embodiment.

Second Embodiment

The following describes a communication system according to a second embodiment of the present invention.

Figure 13:
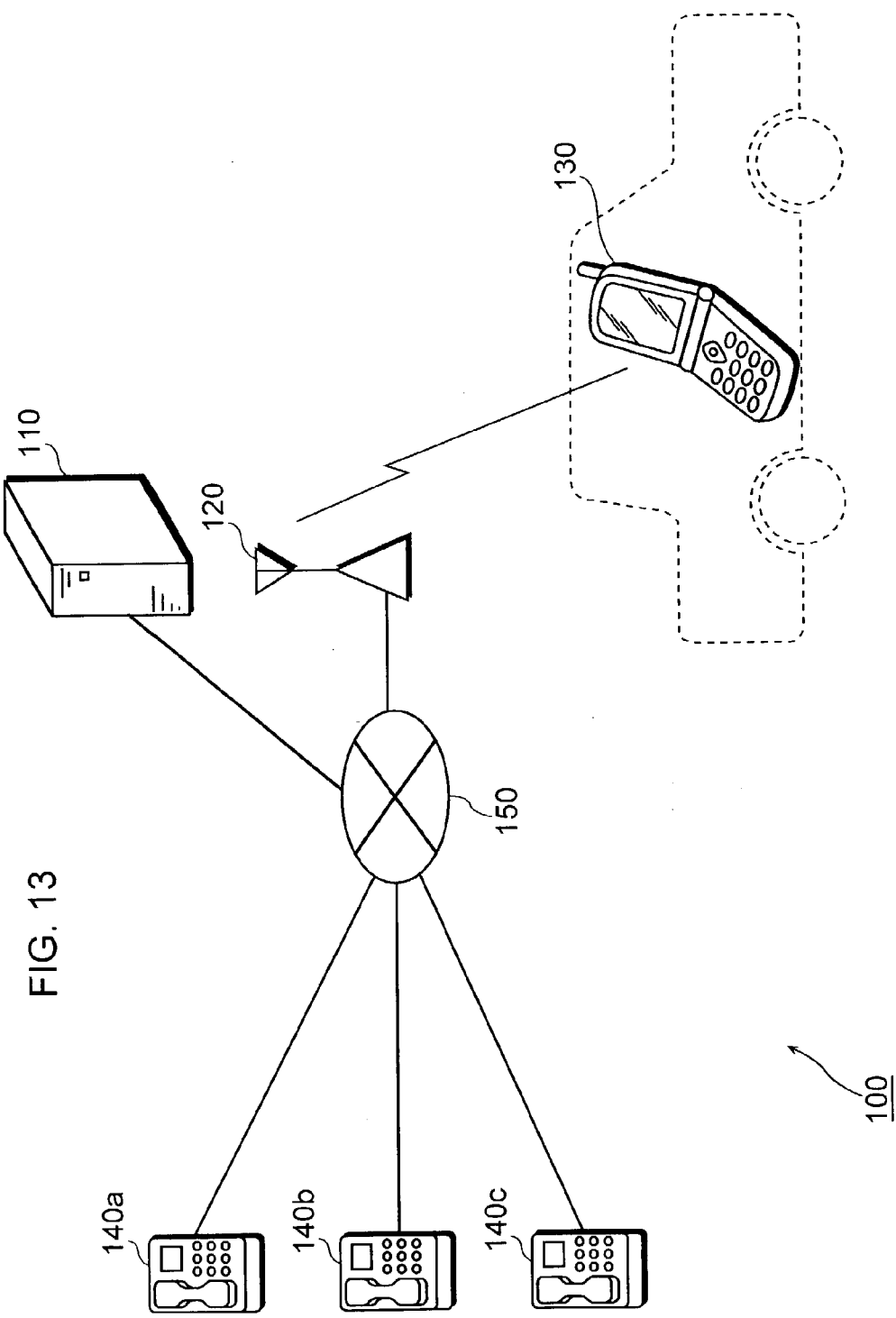
FIG. 13 is a diagram to show a structure of a communication system for the second embodiment according to the present invention.

FIG. 13 is a structure diagram of the communication system 100 according to the second embodiment of the present invention.

This communication system 100 is to reduce the user's nuisances of a mobile communication device in a situation where the mobile communication device is moved via an area in a bad communication status such as a tunnel or a mountainous area. The communication system 100 includes the following elements: a portable telephone 130 as the above mobile communication device; three general telephones 140*a*–140*c* respectively installed at each house; a base station 120 placed at a specific location to exchanges a radio wave as a wireless communication medium with the portable telephone 130; a communication line network 150 to connect the portable telephone 130 with each telephone 140*a*–140*c* via the base station 120; and a server 110 to control communication between the portable telephone 130 and each telephone 140*a*–140*c*.

Figure 14:
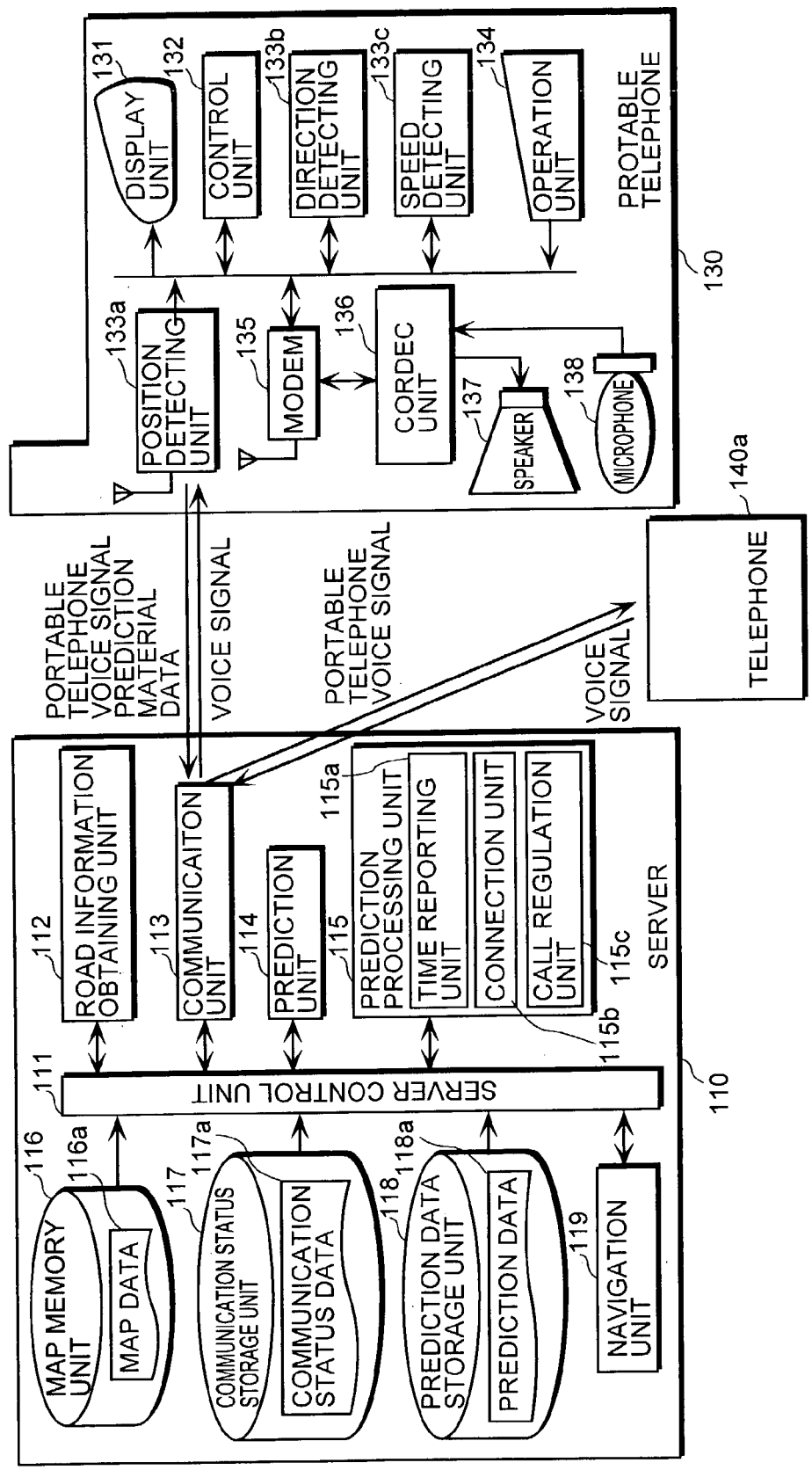
FIG. 14 is a block diagram to show an internal structure of a server and a portable telephone of the communication system of the second embodiment.

FIG. 14 is a block diagram to show internal structures of the server 110 and the portable telephone 130 in the communication system 100 of the second embodiment.

The portable telephone 130 is equipped with a display unit 131 including a microphone 138, a speaker 137 and a liquid crystal display, a modem 135 that sends and receives signals via the communication line network 150 and executes A/D (analog-to-digital) conversions and D/A (digital-to-analog) conversions for the sent and received signals, a CODEC unit 136 that compresses and decompresses data, a control unit 132 that controls the microphone 138 and speaker 137 or the like, buttons including a button to enter a telephone number, and an operation unit 134 to output signals according to operations of these buttons to the control unit 132.

When the modem 135 is connected to each telephone 140*a*–140*c* via the base station 120 and the communication line network 150, the control unit 132 of the portable telephone 130 collects the user's voice via the microphone 138, converts the portable telephone voice signal indicating the voice to A/D for the modem 135, and then sends the portable telephone voice signal to the telephone 140*a*–140*c* being on-line. Then, when the modem 135 obtains a voice signal indicating the user's voice of the telephone 140*a*–140*c* from the telephone 140*a*–140*c*, the control unit 132 converts the voice signal to D/A and outputs the converted voice to the speaker 137. As a result, the communication system 100 makes it possible to communicate between the portable telephone 130 and the telephone 140*a*–140*c* being connected to the line. Each of the portable telephone signal and the voice signal mentioned above are sent and received between the portable telephone 130 and any of the telephones 140*a*–140*c*.

The portable telephone 130 additionally includes the following elements: a position detecting unit 133*a* that detects its own position (i.e., a current position of the portable telephone 130) by obtaining GPS data indicating a position from a GPS satellite; a direction detecting unit 133*b* that detects a moving direction of the portable telephone 130 based on a detected result of the position detecting unit 133*a*; and a speed detecting unit 133*c* that detects a moving speed of the portable telephone 130 based on the detected result of the position detecting unit 133*a*.

The position detecting unit 133*a* detects its own position, for example "135° 25' 30 east longitude, 40° 30' 25" north latitude", for each specific time such as every 5 seconds or every 1 minute, and outputs the detected position information indicating the detected result.

The direction detecting unit 133*b* obtains the detected position information from the position detecting unit 133*a*, detects a moving direction of the portable telephone 130 based on changes in the position for each specific time indicated in the detected position information, and outputs direction information indicating the detected moving direction.

The speed detecting unit 133*c* obtains the detected position information from the position detecting unit 133*a*, detects a moving speed of the portable telephone 130 from changes in the position for each specific time indicated in the detected position information, and outputs speed information indicating the detected moving speed.

As stated above, the control unit 132 of the portable telephone 130 obtains the detected position information, direction information and speed information from the position detecting unit 133*a*, the direction detecting unit 133*b* and the speed detecting unit 133*c*, and sends prediction material data including these information from the modem 135 to the server 110. These prediction material data are sent for each specific time or for each specific distance based on the latest detected result output from the position detecting unit 133*a*, the direction detecting unit 133*b* and the speed detecting unit 133*c*. Also, according to changes in the communication status, the latest prediction material data may be sent from the portable telephone 130. When the communication status is changed drastically, it is possible to have the portable telephone 130 send the latest prediction material data frequently.

The server 110 comprises the following elements: a communication unit 113 that sends and receives signals between the portable telephone 130 and each telephone 140*a*–140*c* via the communication line network 150; a map memory unit 116 that memorizes map data 116*a* indicating a map in advance; a communication status storage unit 117 that stores communication status data 117*a* showing a communication status at each position on the map; a navigation unit 119 that obtains detected position information contained in the prediction material data received at the communication unit 113 from the portable telephone 130, and that creates navigation data including information which is necessary for navigating the user from the position indicated in the detected position information to a destination specified by the user of the portable telephone 130; a road information obtaining unit 112 that obtains road traffic information such as through a VICS (Vehicle Information Communication System); a prediction unit 114 that estimates a position of the portable telephone 130 after a specific time based on the prediction material data received at the communication unit 113 from the portable telephone 130, and that predicts a communication status at the predicted position with reference to the communication status data 117*a*; a prediction data storage unit 118 that stores prediction data 118*a* showing a prediction result by the prediction unit 114; a prediction processing unit 115 that executes each process such as a communication connection process based on the prediction data 118*a*; and a server control unit 111 that controls each of the above units. The prediction processing 115 further includes a time reporting unit 115*a*, a connection unit 115*b*, and a call regulation unit 115*c*, which are explained later. The server control unit 111, the prediction unit 114 and the prediction processing unit 115 here are constructed in a CPU (Central Processing Unit), while the map data storage unit 116, the communication status storage unit 117 and the prediction data storage unit 118 are structured in a ROM (Read Only Memory) or RAM (Random Access Memory).

The road obtaining unit 112 obtains road traffic information distributed from the VICS center. This road traffic information contains content informing traffic conditions of each road, etc.

When the navigation unit 119 obtains a navigation request signal that instructs to navigate the user to the destination and the above-described detected position information from the portable telephone 130 via the communication unit 113 and the server control unit 111, the navigation unit 119 reads out the map data 116*a* covering the position indicated in the detected position information to the destination indicated in the navigation request signal from the map memory unit 116. The navigation unit 119 searches for a route from the position indicated in the detected position information to the destination. At this point, the navigation unit 119 obtains the road traffic information from the road information obtaining unit 112 via the server control unit 111, and searches for a route to reach the destination in a quickest way or in a shortest distance along with consideration of traffic conditions, etc. indicated in the road traffic information. Then, the navigation unit 119 outputs navigation data indicating the detected route and the current position of the portable telephone 130 on the map. The navigation data output in this manner is sent by the server control unit 111 from the communication unit 113 to the portable telephone 130. As a result, the map showing the current position of the portable telephone 130 and its surrounding area and the searched route are displayed on the display unit 131 of the portable telephone 130. The speaker 137 of the portable telephone 130 outputs a guiding voice such as "Please turn left at a next crossing". By doing so, the user of the portable telephone 130 can recognize the current position and the route from the current position to the destination. If the user sits next to a driver of the automobile, he can navigate the driver according to the route.

FIG. 15 is a data content diagram to show the content of the communication status data 117*a*.

As shown in FIG. 15, the communication status data 117*a* contains a position information field A11 and a communication level A12. In the position information field A11, position information is registered to indicate each position such as "longitude X1, latitudes Y1" or "longitude X2, latitudes Y2". The communication level at the position indicated in the position information is shown in the communication level field A12. This communication level indicates a communication status, for instance, at 10 difference levels showing the communication level "1" for the worst communication status while the communication level "10" is for the best communication status. For example, as shown in the FIG. 15, in the communication status data 117*a*, the position at "longitude X1, latitudes Y1" is registered to be the worst communication status while the position at "longitude X3, latitudes Y3" is registered to be the best communication status. The prediction unit 114 estimates the position of the portable telephone 130 after a specific time by using the same method as explained in FIG. 5 for the first embodiment.

Based on the prediction material data from the portable telephone 130, the prediction unit 114 decides, for example as shown in the FIG. 5, that the portable telephone 130 is currently located at the position of P0 and is moving to a south-east direction as indicated by a solid arrow in the FIG. 5 at approx. 40 km/hr.

Then, the prediction unit 114 estimates, for example after 1 minute, that the portable telephone 130 will be located at the position of P1 after moving a distance of 40×1/60 km to the south-east direction from the position of P0.

Furthermore, the prediction unit 114 searches the position information indicating the position of P1 from the communication status data 117*a* memorized in the communication status storage unit 117. For example, when the position of P1 is at "longitude X2, latitudes Y2", the prediction unit 114 reads out the communication level "9" corresponding to the position information indicating "longitude X2, latitudes Y2" from the communication status data 117*a*, and predicts that the communication level will be "9" after 1 minute.

In this way, the prediction unit 114 predicts the communication level after a specific time. For example, the prediction unit 114 predicts the communication level after 1 minute, 2 minutes, 3 minutes . . . and so on.

Also, when a route for the destination is searched by the navigation unit 119 and navigation data is sent to the portable telephone 130, the prediction unit 114 estimates the position of the automobile after a specific time by using the same method as explained in FIG. 6 for the first embodiment.

That is to say, the prediction unit 114 recognizes the current position of the portable telephone 130 on the searched route based on the navigation data, and estimates the position of the portable telephone 130 after a specific time along with the searched route based on the speed information contained in the prediction material data. For example, as indicated in FIG. 6, the prediction unit 114 estimates, from the moving speed at the current position P00 on the searched route, that the portable telephone 130 will be located at the position of P01 on the searched route after 1 minute, at the position of P02 after 2 minutes, and at the position of P03 after 3 minutes.

Here, the prediction unit 114 takes accounts of road traffic information obtained by the road information obtaining unit 112 in estimating the position of the portable telephone 130 after a specific time. That is to say, when the portable telephone 130 is located on an automobile exclusive road or the like, the prediction unit 114 decides the portable telephone 130 is brought into the automobile. Then, when the road traffic information indicates the traffic at the position ahead on the searched route is busier than the current position, the prediction unit 114 assumes that the moving speed of the portable telephone 130 will be slower (for example, 20 km/hr) for the busier area than the moving speed at the current position (for example, 40 km/hr), and estimates the position of the portable telephone 130 after a specific time. Also, if the road traffic information indicates the location ahead on the searched route has less traffic than the current position, the prediction unit 114 assumes that the moving speed of the portable telephone 130 will be faster (for example 60 km/hr) for the less busy location than the moving speed at the current position (for example 40 km/hr), and estimates the position of the portable telephone 130 after the specific time. By using the road traffic information in this way, the prediction unit 114 can estimate the location of the portable telephone 130 more accurately and estimate a more precise communication level.

Additionally, information related to a speed limit for each road (speed limit information) is included in the map data 116a memorized in the map memory unit 116. Therefore, the prediction unit 114 takes account of the speed limit information contained in the map data 116a in estimating the position of the portable telephone 130 after a specific time. That is to say, in the above example, in a situation where the moving speed in the location ahead on the searched route is presumed to be 60 km/hr based on the road traffic information at the present location where the moving speed of the portable telephone 130 is at 40 km/hr, if the speed limit on the road ahead is indicated as 50 km/hr in the speed limit information, the prediction 114 assumes the moving speed will be 50 km/hr and estimates the position of the portable telephone 130 after a specific time. By using the speed limit information in this way, the prediction 114 estimates the position of the portable telephone 130 more accurately and predicts a more precise communication level.

Then, the prediction 114 makes the prediction data storage unit 118 store the predicted result as prediction data 118a.

FIG. 16 is a data content diagram to show the content of the prediction data 118a.

As indicated in FIG. 16, the prediction data 118a has a time information field B1 and a communication level field B2. Time information indicating time such as "after 1 minute" or "after 2 minutes" is registered in the time information field B1, while a communication level at the time shown in the time information is registered in the communication level field B2. That is to say, the communication level "after 1 minute" is "1" and the communication level "after 2 minutes" is "3" are registered in the prediction data 118a shown in the FIG. 16.

Also, every time the prediction material data is obtained from the portable telephone 130, the prediction 114 conducts a prediction such as described above based on the latest prediction material data and updates the prediction data 118a.

In the above explanation, the prediction 114 predicts a future communication level in every 1 minute increment such as after 1 minute, 2 minutes, 3 minutes . . . and so on, but its time interval is not only limited to 1 minute increments, it may be increments every 10 seconds or something else. Also, the time interval of the prediction may be longer or shorter according to changes in the communication status.

The prediction processing unit 115 includes the following elements: a time reporting unit 115a that reports, to the user of the portable telephone 130 and his calling party, the time that is allowed for communication, etc. based on the communication level predicted by the prediction 114, i.e. the prediction data 118a stored in the prediction data storage unit 118; a connection unit 115b that instructs the server control unit 111 to conduct a connection process between the portable telephone 130 and each telephone 140a–140c via the communication line network 150 when the portable telephone 130 goes through the area in a bad communication status; and a call regulation unit 115c that regulates incoming and outgoing calls of the portable telephone 130 when the portable telephone 130 goes through the place in a good communication status only for a short time within the area in the bad communication status.

In a situation where a communication line is connected between the portable telephone 130 and any of the telephones 140a–140c and each of the users are communicating on the phones, if the time reporting unit 115a decides, based on the prediction data 118a, that wireless communication between the portable telephone 130 and a base station 120 will be disconnected because the portable telephone 130 will reach the area in the bad communication status, the time reporting unit 115a informs the user of the portable telephone 130 and his calling party of the communication time (time allowed for communication) that is allowed until the portable telephone 130 reaches the area in the bad communication status. If content, for example the communication level is "9" after 1 minute, "8" after 2 minutes, "5" after 3 minutes, "1" after 4 minutes, is registered in the prediction data 118a, the time reporting unit 115a decides that the portable telephone 130 will reach the area in the bad communication status after 4 minutes and the wireless communication will be disconnected, and creates reporting data indicating its decision result. Then, the time reporting unit 115a outputs the reporting data to the server control unit 111, makes the server control unit 111 control the communication unit 113, and makes the communication unit 113 send the reporting data to the portable telephone 130 and the calling party's telephone 140a–140c. As a result, when the control unit 132 of the portable telephone 130 obtains the reporting data via the modem 135, the control unit 132 makes the display unit 131 display a message such as "The line will be disconnected after 4 minutes", and makes the speaker 137 output an announcement such as "The line will be disconnected after 4 minutes due to the deteriorating communication status" by superimposing the announcement on a voice of the calling party. Furthermore, in the same way as the above-described portable telephone 130, when the telephone 140a–140c obtains the reporting data, the telephone 140a–140c displays the same message as described above, and outputs the above announcement by superimposing the announcement on the voice of the user of the portable telephone 130.

In this way, it is possible in the communication system 100 of the second embodiment to avoid a sudden line disconnection, and therefore, the user of the portable telephone 130 and the user of each telephone 140a–140c can recognize, in advance, when the line is disconnected.

Additionally, in a situation where the communication line is connected between the portable telephone 130 and any of the telephones 140a–140c and each user is on the phone, if the time reporting unit 115 decides, based on the prediction data 118a, that the wireless communication between the portable telephone 130 and the base station 120 will be disconnected because the portable telephone 130 will reach the area in the bad communication status after a specific time and that the portable telephone 130 will thereafter get out from the area in the bad communication status and the wireless communication will become possible again, the time reporting unit 115 reports to the user of the portable telephone 130 and his calling party the time allowed for the communication as described above and the time required for the line reconnection (time required for reconnection).

For example, as stated above, if content, such as the communication level is "5" after 3 minutes, "1" after 4 minutes, "2" after 10 minutes, is registered in the prediction data 118a, the time reporting unit 115a decides that the wireless communication will be disconnected based on the prediction data 118a because the portable telephone 130 will reach the area in the bad communication status after 4 minutes, and then, the wireless communication will thereafter become possible again when the portable telephone 130 gets out from the location in the bad communication status after 10 minutes. Then, the time reporting unit 115a creates reconnection reporting data to show the decision result as described above, outputs the reconnection reporting data to the server control unit 111, makes the server control unit 111 control the communication unit 113, and makes the communication unit 113 send the reconnection reporting data to the portable telephone 130 and the telephone 140a–140c of the calling party.

As a result, when the control unit 132 of the portable telephone 130 obtains the reconnection reporting data via the modem 135, the control unit 132 makes the display 131 display characters such as "It is possible to reconnect the line after 10 minutes", and makes the speaker 137 output an announcement such as "It is possible to reconnect the line after 10 minutes" with superimposing it on a communication voice of the calling party. Additionally, in the same way as the portable telephone 130, when the telephone 140a–140c obtains the reconnection reporting data, it displays the above message and outputs the above announcement by superimposing it on the user's voice of the portable telephone 130.

In this way, it is possible in the communication system 100 of the second embodiment for the user of the portable telephone 130 and his calling party communicating on the phone to know the time required for reconnection. Because the communication system 100 makes it easy for the users to handle a predicted disconnection and the time required for reconnection, nuisances of the user and his calling party are thus removed.

Figure 17:
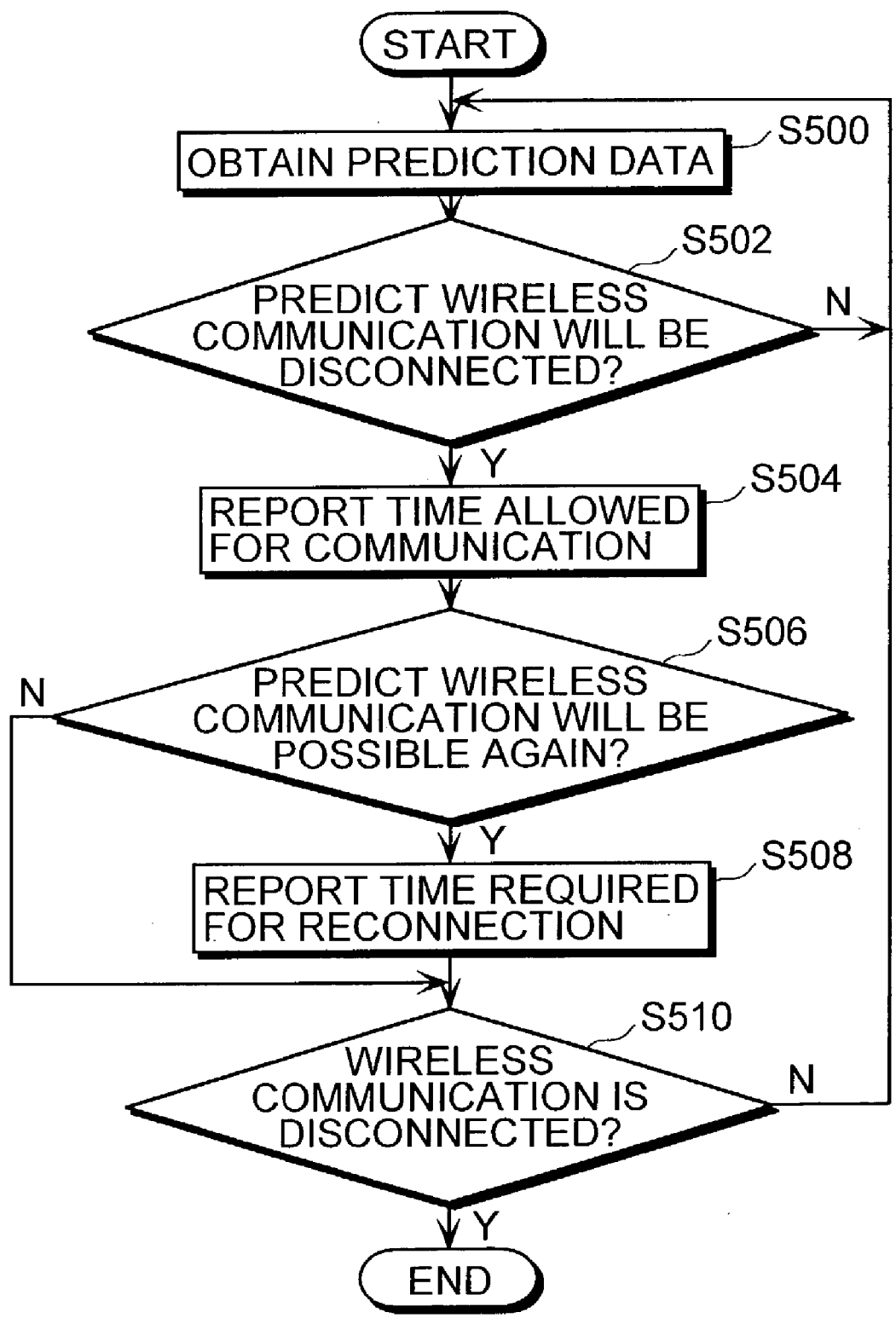
FIG. 17 is an action flow diagram to show a series of actions taken by a time reporting unit.

With reference to FIG. 17, the following describes a series of actions taken by the time reporting unit 115a of the prediction processing unit 115 as described above.

FIG. 17 is an action flow diagram to show a series of actions taken by the time reporting unit 115a when a communication line is connected between the portable telephone 130 and the telephone 140a.

First, the time reporting unit 115a obtains the prediction data 118a from the prediction data storage unit 118 (Step S500). Then, the time reporting unit 115a predicts whether or not the wireless communication is disconnected based on the prediction data 118a (Step S502). If the wireless communication is predicted to be disconnected after 5 minutes (Y in Step S502), the time reporting unit 115a creates the reporting data and reports to the user of the portable telephone 130 and his calling party the time allowed for communication (5 minutes) (Step S504). On the other hand, if the wireless communication is predicted not to be disconnected in the Step S502 within a specific time (N in Step S502), the time reporting unit 115a repeats the action to obtain the latest prediction data 118a from the prediction data storage unit 118 and repeats actions from the Step S500.

Moreover, when the time reporting unit 115a predicts the wireless communication will be disconnected in the Step S502, the time reporting unit 115a further predicts whether or not the wireless communication will be possible again within a specific time based on the prediction data 118a (Step S506). As a result, if the time reporting unit 115a predicts that the wireless communication is possible after 9 minutes (Y in Step S506), the time reporting unit 115a creates the reconnection reporting data and informs the user of the portable telephone 130 and his calling party of the time required for reconnection (9 minutes) (Step S508). Then, if the time reporting unit 115a recognizes that the line is actually disconnected via the server control unit 111, the time reporting unit 115a terminates the process (Y in Step S510). If the line is not disconnected (N in Step S510), the time reporting unit 115a repeats actions from the Step S500 once again.

As a result, until the wireless communication is disconnected, announcements, such as "The line will be disconnected after 5 minutes due to the poor communication status" and "Reconnection is possible after 9 minutes", and one minute later, "The line will be disconnected after 4 minutes due to the poor communication status" and "Reconnection is possible after 8 minutes" and so on, are repeatedly output from the portable telephone 130 and the telephone 140a of his calling party.

Also, if the wireless communication is predicted to be impossible within the specific time in the Step S506 (N in Step S506), the time reporting unit 115a executes actions from Step S510 without informing the time required for reconnection.

In this way, when the communication line is connected between the portable telephone 130 and one of the telephones 140a–140c, the time reporting unit 115a repeats actions from Step S500 to Step S510, and reports the time allowed for communication and the time required for reconnection based on the result of when the latest prediction data 118 a is obtained by the prediction data storage unit 118.

On the other hand, in a situation where each of the users are communicating through the communication line connected between the portable telephone 130 and one of the telephones 140a–140c, if the connection unit 115b of the prediction processing unit 115 in the second embodiment decides the wireless communication will be disconnected in the near future, the connection unit 115b decides whether the time that is not allowed for communication is the same as or less than the maximum holding time.

At this point, when the connection unit 115b decides the time that is not allowed for communication is the same as or less than the maximum holding time, the connection unit 115b maintains the communication between the telephone 140a–140c, which is a calling party of the portable telephone 130, and the server 110, and puts the telephone 140a–140c on hold even if the wireless communication is disconnected between the portable telephone 130 and the base station 120. Then, when the connection unit 115b decides that the portable telephone 130 can make the wireless communication, the connection unit 115b connects the line once again between the portable telephone 130 and the telephone 140a–140c put on hold.

To be more specific, when the connection unit 115b decides that the time not allowed for communication is the same as or less than the maximum holding time, the connection unit 115b instructs the server control unit 111 to become informed of the telephone number of the portable telephone 130 to reconnect the line after the wireless communication is disconnected. The server control unit 111 receiving such an instruction obtains the telephone number from the portable telephone 130 via the communication unit and informs the telephone number to the connection unit 115b. Then, the connection unit 115b retains the notified telephone number.

Moreover, the connection unit 115b creates termination reporting data indicating a communication termination such as "The communication is terminated due to the bad communication status", and outputs the communication termination data to the server control unit 111, makes the server control unit 111 control the communication unit 113, and makes the communication unit 113 send the communication termination data to the portable telephone 130.

As a result, if the control unit 132 of the portable telephone 130 obtains the termination reporting data via the modem 135, the control unit 132 makes the display unit 131 display characters such as "The communication will be terminated due to the poor communication status", and makes the speaker 137 output an announcement such as ""The communication will be terminated due to the poor communication status" by superposing the announcement on the communication voice of the calling party.

In addition, the connection unit 115b instructs the server control unit 111 to terminate the communication automatically. The server control unit 111 receiving such an instruction of automatic termination has the communication unit 113 put the portable telephone 130 on the hook by controlling the communication unit 113. As a result, the communication between the portable telephone 130 and the server 110 is terminated normally.

Then, even when the communication between the communication unit 113 of the server 110 and the portable telephone 130 is automatically terminated, the connection unit 115b maintains the communication between the communication unit 113 of the server 110 and the telephone 140a–140c, which is a calling party of the portable telephone 130. In the meantime the communication is maintained, the connection unit 115b creates holding notification data indicating "holding", makes the server control unit 111 control the communication unit 113, and makes the communication unit 113 send the holding notification data to the telephone 140a–140c. As a result, when the telephone 140a–140c obtains the holding notification data, the telephone 140a–140c outputs an announcement such as "It is suspended. Please wait" until the line is reconnected with the portable telephone 130. That is to say, the telephone 140a–140c is put on hold.

Furthermore, after the telephone 140a–140c is put on hold as described above, if the connection unit 115b decides the portable telephone 130 gets out from the area in the bad communication status, the connection unit 115b makes the communication unit 113 to resume the communication with the portable telephone 130 via the server control unit 111 by using the telephone number retained before the line disconnection. Then, the connection unit 115b releases the holding status of the telephone 140a–140c and makes it possible to communicate with the telephone 140a–140c. In short, the communication line between the portable telephone 130 and the telephone 140a-140 is reconnected.

In this way, because the communication termination due to the bad communication status is reported in advance in the communication system 100 of the second embodiment, the communication system 100 can avoid the sudden disconnection of the line. Since the communication is automatically terminated and reconnected when the communication status gets better without requiring the user's operation of the portable telephone 130, the communication system 100 reduces the user's nuisances of the portable telephone 130 and improves ease of the use. That is to say, even through the report by the above-described time reporting unit 115a or even when the user continues his communication without terminating the communication manually, the communication is automatically terminated and reconnected as described above so as to further reduce the nuisances of the user. Also, if the time that is not allowed for communication is short, the telephone 140a–140c which has been communicating with the portable telephone 130 is put on hold, the communication system 100 does not require the user of the telephone 140a–140c to put the telephone 140a–140c on the hook so as to reduce such a useless action of the user.

Figure 18:
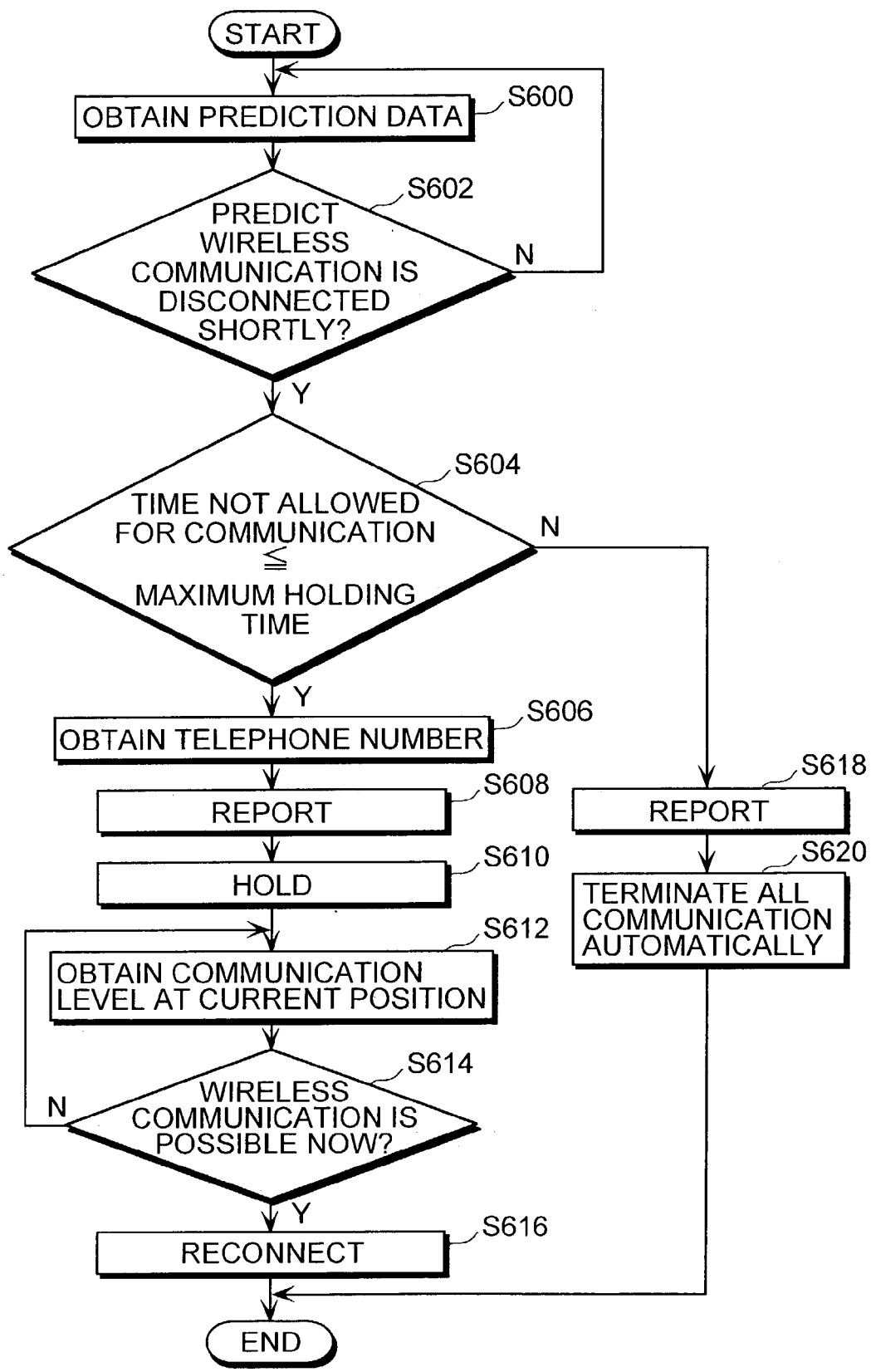
FIG. 18 is an action flow diagram to show a series of actions taken by a connecting unit.

With reference to FIG. 18, the following describes a series of actions taken by the connection unit 115b of the prediction processing unit 115 as described above.

FIG. 18 is an action flow diagram to show a series of actions taken by the connection unit 115b.

First, the connection unit 115b obtains prediction data 118a (Step S600), and predicts whether or not the wireless communication between the portable telephone 130 and the base station 120 will be disconnected shortly (Step S602). Then, if the connection unit 115b predicts that the wireless communication will be disconnected shortly (Y in Step S602), the connection unit 115b decides whether or not the time that is not allowed for communication is the same as or less than the maximum holding time (Step S604). If the connection unit 115b predicts it will not happen shortly (N in Step S602), the connection unit 115b repeats actions from the Step S600.

When specifying the time that is not allowed for communication in the Step S604, if the connection unit 115b decides an interval from one occasion of the time not allowed for communication to a next occasion of the time not allowed for communication is extremely short, the connection unit 115b also regards the interval as the time when the communication should not be allowed, and combines these time durations to specify them as the time that is not allowed for communication. In this way, the connection unit 115b can avoid a troublesome connection process.

Next, when the connection unit 115b decides the time that is not allowed for communication is the same as or less than the maximum holding time (Y in Step S604), the connection unit 115b obtains the telephone number from the portable telephone 130 via the server control unit 111 and the communication unit 113 (Step S606), and reports the communication termination to the user of the portable telephone 130 and his calling party (Step S608). Then, the connection 115b automatically terminates the communication between the communication unit 113 and the portable telephone 130, and puts the telephone 140a–140c, which is a calling party of the portable telephone 130, on hold (Step S610). On the other hand, if the time that is not allowed for communication is decided to be longer than the maximum holding time, or if the time that is not allowed for communication is decided to be unpredictable from the prediction data 118a (N in Step S604), the connection unit 115b sends the termination reporting data from the communication unit 113 to the portable telephone 130 and the telephone 140a–140c of the calling party, and reports the communication termination to the user of the portable telephone 130 and his calling party (Step S618). Then, the connection unit 115b makes the server control unit 111 control the communication unit 113, and automatically terminates the communication between the communication unit 113 and the portable telephone 130, as well as the communication between the communication unit 113 and the telephone 140a-140, which is a calling party of the portable telephone 130 (Step S620).

Next, the connection unit 115b obtains a communication level at the current position of the portable telephone 130 by obtaining the detected position information contained in the prediction material data after Step S610, and reading out the communication level corresponding to the position indicated in the detected position information from the communication status data 117a (Step S612). Then, the connection unit 115b decides whether or not the wireless communication is currently possible for the portable telephone 130 based on the communication level (Step S614). As a result, if the wireless communication is decided to be possible (Y in Step S614), the connection 115b makes the communication unit 113 resume the communication with the portable telephone 130 via the server control unit 111, and reconnects the communication line between the portable telephone 130 and the telephone 140a–140c, which has been the calling party (Step S616). Here, the connection unit 115 confirms whether or not the reconnection has been completed, and repeats to reconnect it if the reconnection is not completed. Then, if the reconnection is not successfully completed after several attempts or after a specific time, the connection unit 115 gives up the reconnection process.

Also, if the wireless communication is decided to be impossible for the portable telephone 130 in step S614 (N in the Step S614), the actions from Step S612 are repeated.

The call regulation unit 115c of the prediction processing unit 115 regulates incoming and outgoing calls of the portable telephone 130 when the portable telephone 130 goes through a place in a good communication status just for a short time while driving through the area in the bad communication status. In this way, a sudden disconnection of the communication is prevented so that nuisances that the user of the portable telephone 130 and the user of the telephone 140a–140c who made a call to the portable telephone 130 can be reduced.

Figure 19:
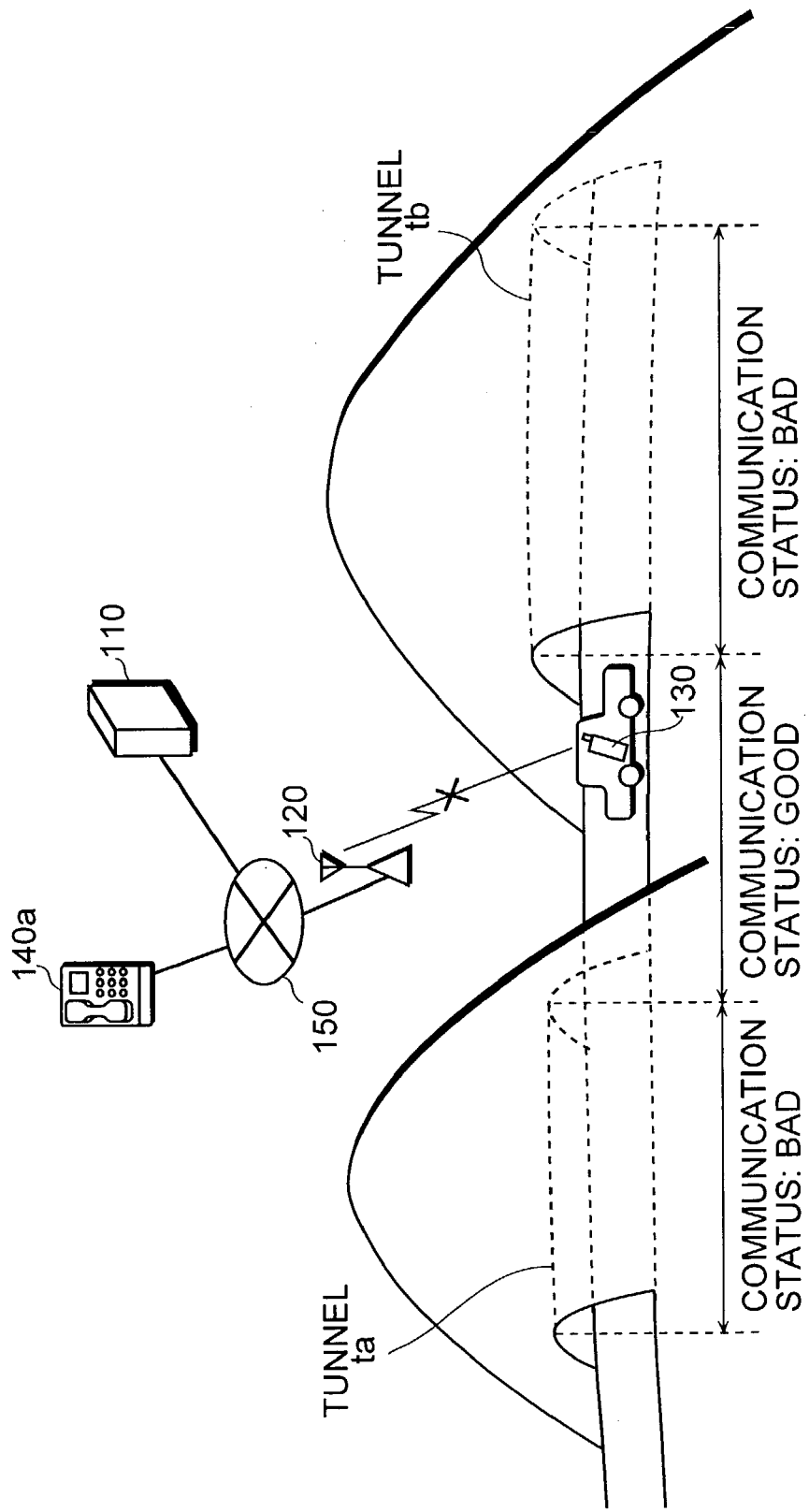
FIG. 19 is an explanatory diagram to describe how the automobile in which a portable telephone is brought drives through two tunnels.

With reference to FIG. 19, the following describes an example in which the portable telephone 130 goes through the location where the communication status changes as described above.

FIG. 19 is an explanatory diagram to describe how an automobile in which the portable telephone 130 is brought drives through two tunnels.

As shown in FIG. 19, there are two tunnels ta and tb that are located close to each other on a road. Also, a communication status is bad in both tunnels ta and tb, whereas the area between the tunnels ta and tb has a good communication status. Therefore, if the automobile drives on the road from the tunnel ta to the tunnel tb, the automobile realizes a good communication status just for a short time when the automobile travels the distance between the tunnels ta and tb.

In a situation where the automobile goes through the area in the bad communication status, for example, the automobile drives in the tunnel ta in the FIG. 19, and a communication line is not connected between the portable telephone 130 and one of the telephones 140a–140c, and if the call regulation unit 115c decides that the wireless communication will be possible because the portable telephone 130 will reach the area in the good communication status within a specific time, the call regulation unit 115c further decides whether or not the time allowed for wireless communication is shorter than the minimum calling time. When the time allowed for the wireless communication is decided to be shorter than the minimum calling time, the call regulation unit 115c subsequently decides whether or not the portable telephone 130 is currently traveling in the area in the good communication status. If yes, the call regulation unit 115c regulates incoming and outgoing calls of the portable telephone 130. That is to say, the call regulation unit 115c outputs, to the server control unit 111, a regulation signal instructing to nullify signals: an outgoing operation signal instructing to connect one of the telephones 140a–140c sent from the portable telephone 130 to the server 110; and an incoming call notification signal instructing to connect to the portable telephone 130 sent from one of the telephones 140a–140c to the server 110. In this way, even if the server control unit 111 receives the outgoing operation signal and the incoming call notification signal via the communication unit 113, the call regulation unit 115c nullifies them so that incoming and outgoing calls for the portable telephone 130 are regulated.

Also, if the call regulation unit 115 receives a notification of receiving the above-described outgoing call operation signal from the server control unit 111 when outputting the regulation signal, the call regulation unit 115c informs the user of the portable telephone 130 that the signal is being nullified, i.e. the outgoing call from the portable telephone 130 is regulated, through the display unit 131 and the speaker 137 of the portable telephone 130. That is to say, the call regulation unit 115c creates an outgoing call regulation notification signal that informs outgoing calls are regulated from the portable telephone 130, and makes the communication unit 113 send the outgoing call regulation notification signal to the portable telephone 130 via the server control unit 111. Then, the control unit 132 of the portable telephone 130 receiving this outgoing call regulation notification signal via the modem 135 makes the display unit 131 display the content indicated in the outgoing call regulation notification signal and makes the speaker 137 output the content.

Additionally, if the call regulation unit 115c receives a notification of receiving the above-described incoming call notification signal when the regulation signal is output, the call regulation unit 115c informs the user of the telephone 140a–140c, which sent the incoming call notification signal, that the signal is nullified, i.e. the incoming call to the portable telephone 130 is regulated. That is to say, the call regulation unit 115c creates the incoming call regulation notification signal to inform that the incoming call to the portable telephone 130 is regulated, and makes the communication unit send the incoming call regulation notification signal to the telephone 140a–140c via the server control unit 111. Then, the telephone 140a–140c receiving this incoming call regulation notification signal makes the speaker 137 output the content indicated in the incoming call regulation signal.

The following describes an example of actions taken by the call regulation unit 115c of the prediction processing unit 115 with reference to FIG. 20.

FIG. 20 is an action flow diagram to show an example of actions taken by the call regulation unit 115c in a situation where the portable telephone 130 is traveling in the area in the bad communication status and a communication line is not connected between the portable telephone 130 and the telephone 140a–140c.

First, the call regulation unit 115c obtains the prediction data 118a (Step S700), and predicts whether or not the wireless communication is possible between the portable telephone 130 and the base station 120 based on the prediction data 118a (Step S702). Then, if the wireless communication is predicted to be possible (Y in Step S702), the call regulation unit 115c decides whether or not the time allowed for the wireless communication is shorter than the minimum calling time (Step S704). If the wireless communication is predicted to be impossible (N in Step S702), the call regulation unit 115c repeats the actions from the Step S700 and obtains the prediction data 118a once again.

Next, if the time allowed for the wireless communication is decided to be shorter than the minimum calling time in Step S704 (Y in Step S704), the call regulation unit 115c obtains a communication level at the current position of the portable telephone 130 by obtaining the detected position information contained in the prediction material data and reading out the communication level corresponding to the position indicated in the detected position information (Step S706). Then, the call regulation unit 115c decides whether or not the wireless communication is currently possible for the portable telephone 130 based on the communication level (Step S710). Here, if the wireless communication is decided to be possible (Y in Step S710), the call regulation unit 115c outputs a regulation signal and nullifies incoming and outgoing calls of the portable telephone 130 (Step S712). If the wireless communication is decided to be impossible (N in Step S710), the call regulation unit 115c obtains the latest prediction data 118a and repeats the actions from the Step S706 once again. Also, if the time allowed for the wireless communication is decided to be the same as or longer than the minimum calling time in the Step S704 (N in Step S704), the call regulation unit 115c keeps stopping the regulation signal output and allows the incoming and outgoing calls for the portable telephone 130 (Step S708).

Then, after the Step S712, i.e. when the regulation signal is output, the call regulation unit 115c decides whether or not the outgoing call operation signal or the incoming call notification signal is received at the server control unit 111 according to a notification from the server control unit 111 (Step S714). Then, if the call regulation unit 115c decides the outgoing call operation signal or the incoming call notification signal is received by the server control unit 111 (Y in Step S714), the call regulation unit 115c outputs an outgoing call regulation notification signal or an incoming call regulation notification signal, and informs the user of the portable telephone 130 and the user of the telephone 140a–140c, which sent the incoming call notification signal, that the incoming and outgoing calls for the portable telephone 130 (Step S716) are regulated as described above.

Next, after Step S716, or when the outgoing call operation signal or the incoming call notification signal is decided not to have been received in Step S714 (N in Step 714), the call regulation unit 115c obtains a communication level at the current position of the portable telephone 130 (Step S718) once again, and decides whether or not the wireless communication for the portable telephone 130 is currently impossible based on the communication level (Step S720). Here, if the wireless communication is decided to be currently impossible (Y in Step S720), the call regulation unit 115c stops the regulation signal being output in Step S712, and cancels nullification of incoming and outgoing calls of the portable telephone 130 (Step S722). If the wireless communication is decided to be currently possible (N in the Step S720), the call regulation unit 115c repeats the actions from the Step S714 again.

FIG. 21A is a screen display diagram to show an example of a screen indicated in the display unit 131 when the call regulation unit 115c informs the user of the portable telephone 130 that the outgoing calls are regulated in Step S716.

As indicated in FIG. 21A, messages such as "You cannot make a call because communication status gets worse shortly", "Predicted time allowed for call: 1 minute" and "Press 1 to release regulation" are displayed in the display unit 131.

These messages are displayed in the display unit 131 which is controlled by the control unit 132 of the portable telephone 130 based on the outgoing call regulation notification signal. That is to say, the call regulation unit 115c calculates the time allowed for communication according to the time allowed for the wireless communication decided in Step S704 and the time duration from a point that the wireless communication is decided to be possible in Step S704 to the point that the outgoing operation signal is received in Step S714, and includes information indicating the predicted time allowed for communication in the outgoing call regulation notification signal. As a result, the message of "Predicted time allowed for call: 1 minute" is displayed in the display unit 131 of the portable telephone 130. For example, for the case where the time allowed for the wireless communication is decided to be 2 minutes in Step S704, and the time duration is 1 minute from the point that the wireless communication is decided to be possible in Step S710 to the point that the outgoing call operation signal is received in the Step S714, "Predicted time allowed for call: 1 minute" as indicated in the FIG. 21 A is displayed. Also, if it is 1 and a half minutes from that point that the wireless communication is decided to be possible in Step S710 to the point that the outgoing call operation signal is received in Step S714, "Predicted time allowed for call: 30 seconds" is displayed.

Here, if the user of the portable telephone 130, who sees the message of "Press 1 to release regulation", presses the button "1" on the operation unit 134, the control unit 132 of the portable telephone 130 makes the modem 135 send a release signal instructing to cancel the regulation to the server 110. Then, when the call regulation unit 115c receives the release signal via the communication unit 113 and the server control unit 111, the call regulation unit 115c stops the regulation signal output. As a result, since the output of the regulation signal is stopped, the server control unit 111 regards the outgoing call operation signal from the portable telephone 130 as being valid, and the outgoing call regulation of the portable telephone 130 is canceled.

FIG. 21B is a screen display diagram to show an example of a screen indicated in the display unit 131 when regulation of the incoming call for the call regulation unit 115c is informed to the user of the portable telephone 130 in Step S716.

As shown in FIG. 21B, messages such as "Receiving call, but cannot answer because communication status gets worse shortly", "Predicted time allowed for call: 1 minute" and "Press 2 to release regulation".

These messages are displayed by the control unit 132 of the portable telephone 130 controlling the display unit 131 based on the incoming call regulation signal. That is to say, the call regulation unit 115c calculates the time allowed for communication according to the time allowed for the wireless communication decided in Step S704 and the time duration from the point that the wireless communication is decided to be possible in Step S710 to the point that the incoming call notification signal is received in Step S714, and includes information indicating the predicted time allowed for communication in the incoming call regulation signal. As a result, the message of "Predicted time allowed for call: 1 minute" is displayed in the display unit 130 of the portable telephone 130.

If the user of the portable telephone 130 who sees the message of "Press 2 to release regulation" presses the button "2" on the operation unit 134, the control unit 132 of the portable telephone 130 makes the modem 135 send the release signal instructing to cancel the regulation to the server 110. Then, when the call regulation unit 115c receives the release signal via the communication unit 113 and the server control unit 111, the call regulation unit 115c stops the regulation signal output. As a result, because the output of the regulation signal is stopped, the server control unit 111 regards the incoming call notification signal from the telephone 140a–140c as being valid, and the incoming call regulation of the portable telephone 130 is canceled.

Figure 22:
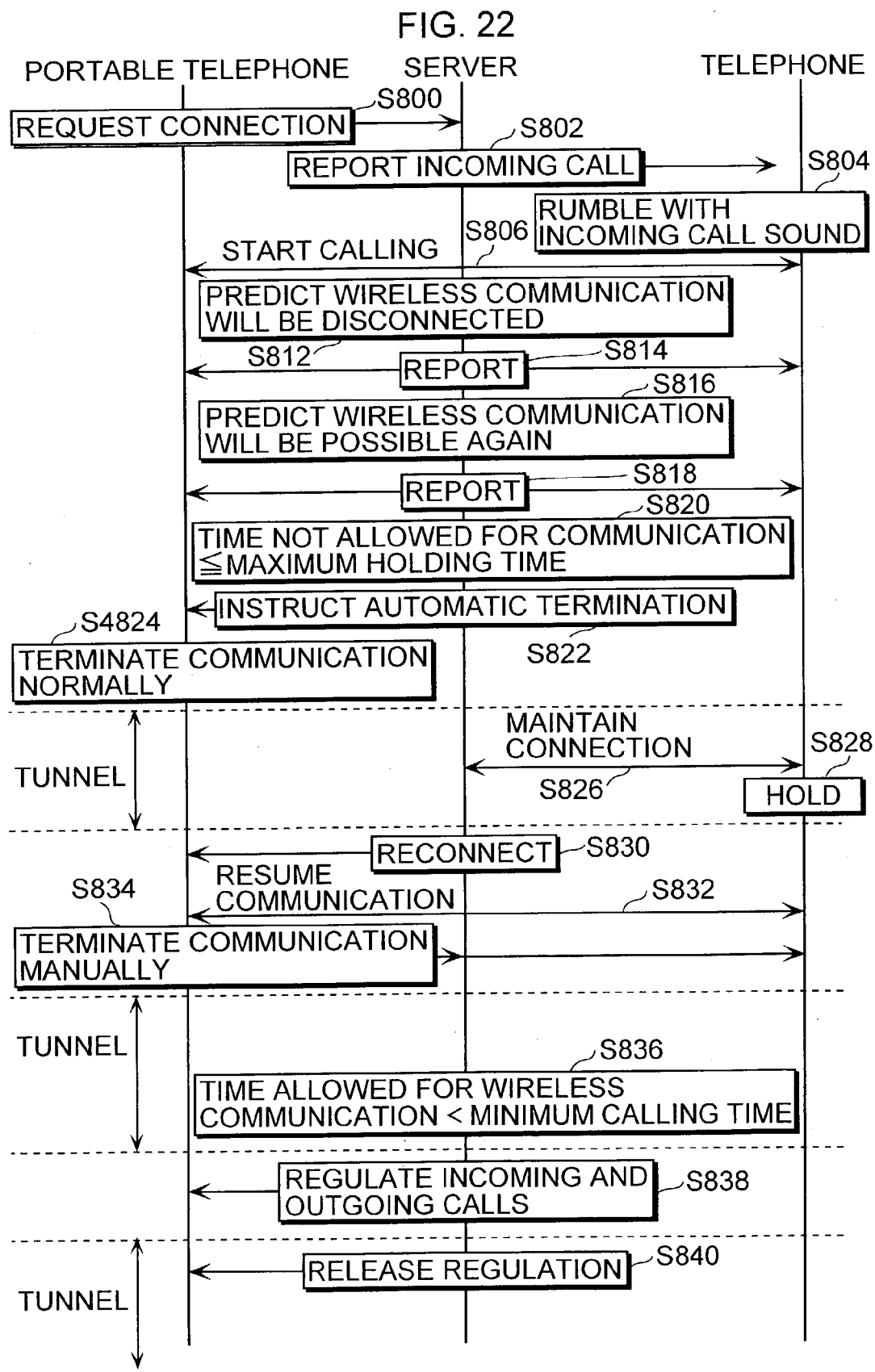
FIG. 22 is a sequence diagram to show characteristic actions taken by the communication system.

The following describes characteristic actions of the communication system 100 of the second embodiment with reference to the FIG. 22.

FIG. 22 is a sequence diagram to show characteristic actions of the communication system 100 in a process where an automobile in which the portable telephone 130 is brought goes through the area in the good and bad communication statuses.

First, when the automobile travels in the area in the good communication status, the portable telephone 130 sends an incoming call operation signal according to the user's operation to the server 110 via the base station 120, and requests the server 110 to connect to the telephone 140a (Step S800).

The server 110 notifies that there is the incoming call from the portable telephone 130 to the telephone 140a indicated in the incoming call operation signal (Step S802). As a result, the telephone 140a rings an incoming call bell (Step S804). Then, when the user of the telephone 140a who hears the incoming call bell takes the telephone 140a off the hook to answer it, the server 110 makes it possible to communicate between the portable telephone 130 and the telephone 140a, where each of the users of the portable telephone 130 and the telephone 140a start their communication (Step S806).

The portable telephone 130 always creates the latest prediction material data and sends the latest prediction material data to the server 110. When the server 110 receives the prediction material data, the server 110 conducts a prediction based on the prediction material data and updates prediction data 118a based on its prediction result.

Next, when the automobile approaches the area in the bad communication such as a tunnel, the server 110 predicts the wireless communication will be disconnected after a specific time based on the prediction data 118a (Step S812), and informs the time allowed for communication to the users of the portable telephone 130 and the telephone 140a by sending announcement data to the portable telephone 130 and the telephone 140a (Step S814). If the server 110 predicts the communication will thereafter become possible once again after the wireless communication is disconnected based on the prediction data 118a (Step S816), the server 110 also sends the reconnection reporting data to the portable telephone 130 and the telephone 140a, and informs the time that is required for reconnection to the users of the portable telephone 130 and the telephone 140a (Step S818).

Additionally, when the automobile approaches the area close to the tunnel, and the server 110 decides the time that is not allowed for communication due to the tunnel is less than the maximum holding time based on the prediction data 118a (Step S820), the server 110 informs termination of the communication to the user of the portable telephone 130 and instructs the portable telephone 130 to automatically terminate the communication (Step S822). As a result, the portable telephone 130 terminates the communication without requiring any operations from the user (Step S824).

Then, when the automobile goes into the tunnel, the server 110 retains the connection with the telephone 140a (Step S826), by putting the telephone 140a on hold (Step S828).

Subsequently, when the automobile gets out from the tunnel and goes into the area in the good communication status, the server 110 connects the line once again with the portable telephone 130 (Step S830), and makes it possible to communicate between the portable telephone 130 and the telephone 140a (Step S832).

Here, if the user of the portable telephone 130 puts the portable telephone 130 on the hook to terminate the communication, the communication between the portable telephone 130 and the telephone 140a is manually terminated (Step S834).

Next, when the automobile goes into a tunnel once again, the wireless communication for the portable telephone 130 becomes impossible. Then, when the automobile approaches the end of this tunnel, the portable telephone 130 predicts that the wireless communication will be possible soon based on the prediction data 118a. Because there is another tunnel close by even if the automobile gets out from the current tunnel, the portable telephone 130 further predicts the time allowed for the wireless communication will be shorter than the minimum calling time (Step S836).

Then, when the automobile gets out from the tunnel and goes into the area in the good communication status right before the aforementioned other tunnel, the server 110 regulates incoming and outgoing calls of the portable telephone 130 (Step S838). In this way, the user does not have to make a call that may be suddenly disconnected so as to avoid nuisances of the user.

Subsequently, when the automobile goes into the aforementioned other tunnel, the server 110 decides the automobile is in the area in the bad communication status once again, and cancels the above-described regulation to the portable telephone 130 (Step S840).

In this way, through the communication system 100 of the second embodiment, even if the communication status is changed by moving, nuisances felt by the user of the portable telephone 130 and his calling party can be lightened.

Also, because the server 110 includes the map memory unit 116 and the communication status storage unit 117 in this second embodiment, the server 110 is able to collectively manage the map data 116a and the communication status data 117a. That is to say, if the map memory unit 116 and the communication status storage unit 117 are included in the portable telephone 130, the user of the portable telephone 130 is supposed to manage the map data 116a and the communication status data 117a and must make a change if there is a need to change these data. However, in this embodiment, because both is the map data 116a and the communication status data 117a are managed by the server 110 as mentioned above, it is possible to eliminate an extra burden for the user of the portable telephone 130.

Furthermore, in this embodiment, the example is given on the basis that the portable telephone 130 is brought into the automobile and travels with the automobile; however, the same effects as described above are provided even if the user carries the portable telephone 130 with him and travels with the portable telephone 130.

Variation

The following describes a variation example of the communication system in the above-described second embodiment.

The communication system in this variation includes a plural number of portable telephones as a mobile communication device.

Figure 23:
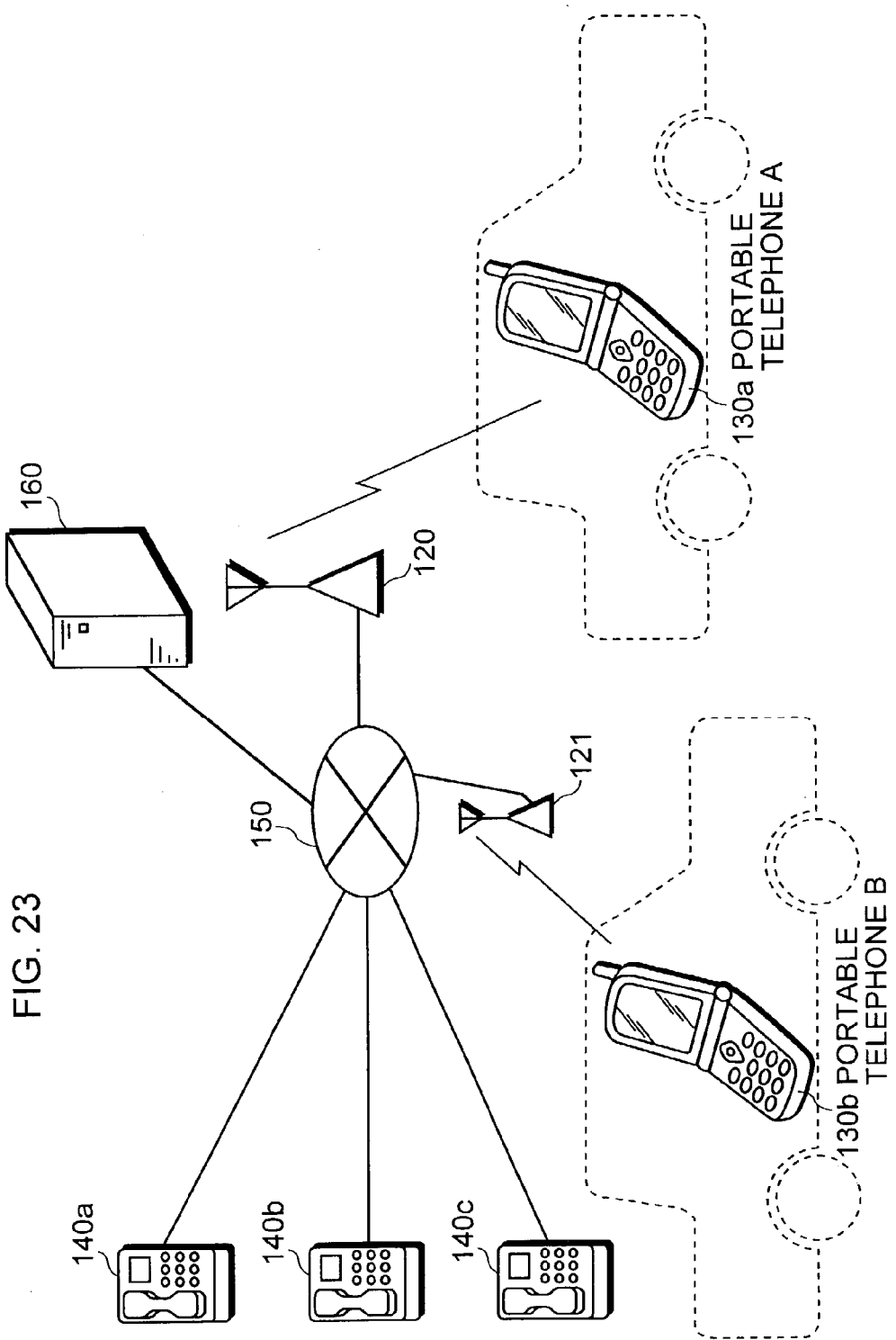
FIG. 23 is a diagram to show a structure of a communication system related to a variation sample.

FIG. 23 is a system structure diagram to show the structure of the communication system in this variation.

As indicated in FIG. 23, this communication system includes a portable telephone A130a, a portable telephone B130b, a server 160, base stations 120 and 121, the communication line network 150 and three telephones 140a–140c.

The portable telephone A130a and the portable telephone B130b respectively contain the same functions and the same structure as the portable telephone 130 in the above embodiment. Although the server 160 also has the same structure as the server 110 in the above embodiment, actions taken by a prediction unit and a prediction processing unit in the server 160 are different from the actions taken by the prediction unit and the prediction processing unit in the server 110.

The prediction unit of the server 160 creates prediction data for the portable telephone A130a and prediction data for the portable telephone B130b, based on each of prediction material data from the portable telephone A130a and the portable telephone B130b and stores these prediction data in the prediction data storage unit.

Then, a time informing unit, a connection unit and a call regulation unit in the prediction processing unit of the server 160 predict whether or not a communication line can be connected between the portable telephone A130a and the portable telephone B130b based on these prediction data. That is to say, the time informing unit, the connection unit and the call regulation unit decide that the communication between the portable telephone A130a and the portable telephone B130b becomes possible only when a communication level is high and the wireless communication is predicted to be possible for both of the portable telephone A130a and the portable telephone B130b. Therefore, for example, when the wireless communication is predicted to be possible only for the portable telephone A130a, and the wireless communication is predicted to be impossible for the portable telephone B130b, the time informing unit, the connection unit and the call regulation unit respectively decide that the communication between the portable telephone A130a and the portable telephone B130b is impossible.

FIG. 24 is an explanatory diagram to describe a method to predict the time allowed for communication and time required for reconnection by the time informing unit of the server 160.

The time informing unit predicts, based on the prediction data, that the wireless communication is impossible for the portable telephone A130a for the time between t3–t4, whereas the wireless communication is possible for the time between t1–t3 and the time from t4. Additionally, the time informing unit predicts, based on the prediction data, that the wireless communication is impossible for the portable telephone B130b for the time between t2–t5, while the wireless communication is possible for the time between t1–t2 and the time from t5.

As a result, the time informing unit decides that the communication between the portable telephone A130a and the portable telephone B130b is possible for the time between t1*t*2 and the time from t5, but that the communication is impossible for the time between t2–t5. Then, the time informing unit predicts the time between t1–t2 as the time allowed for communication and the time between t1–t5 is the time required for reconnection.

Accordingly, this variation makes it possible to decide accurately whether communication is possible between portable telephones.

Although the communication device related to the present invention has been explained with reference to the embodiments and the variation, the present invention is not limited thereto.

For example, although longitude and latitude are used to register position information to the communication status data 117a in the embodiments, other descriptions such as an address can be used to register the position information. Moreover, a communication level is registered with a 10 level grading method in the communication status data 117a, but other description methods such as a temporal average value of a radio wave density may be used instead of the 10 level grading method.

In addition, the time reporting unit 115a, the connection unit 115b and the call regulation unit 115c in the prediction processing unit 115 in the second embodiment respectively decide that the line is disconnected when the communication status gets worse and the communication level becomes "1", and decide that the line can be connected when the communication level becomes "2" or higher. However, a threshold value for such a communication level may be something other than "1". Also, the above threshold value may be changed according to the user's operation of the operation unit 134 of the portable telephone 130. In this case, the portable telephone 130 sends standard information indicating a threshold value. When the prediction unit 115 of the server 110 obtains the standard information, the prediction unit 115 decides whether or not the line can be connected based on the threshold value indicated in the standard information. Furthermore, the maximum holding time or the minimum calling time may also be changed according to the user's operation of the operation unit 134 of the portable telephone 130. In this case, the portable telephone 130 sends a time setup signal indicating the maximum holding time or the minimum calling time in the same way as described above. When the connection unit 115b and the call regulation unit 115c of the prediction processing unit 115 of the server 110 respectively obtain the time setup signal, they use the maximum holding time or the minimum calling time indicated in the time setup signal.

Although the server 110 in the second embodiment includes the map memory unit 116, the navigation unit 119, the communication status storage unit 117 and the road information obtaining unit 112, all or a part of these may be included in the portable telephone 130. In this case, the user of the portable telephone 130 can easily modify or update the map data 116a of the map memory unit 116, the communication status data 117a of the communication status storage unit 117, etc.

Alternatively, the server 110 in the second embodiment may include the navigation unit 119, the road information obtaining unit 112, the prediction 114, and the prediction processing unit 115, but these may be contained in the portable telephone 130. In this case, while the server 110 collectively manages the map data 116a and the communication status data 117a, it is possible to make the portable telephone 130 conduct navigation and prediction of the communication level. Also, it is possible for the portable telephone 130 to estimate its own position after a specific time, and for the server 110 to predict the communication level at the estimated position.

Additionally, the speed limit information is contained in the map data 116a in the second embodiment, but average behavior information may also be included. This average behavior information indicates an average speed of the portable telephone 130 and an average direction that the portable telephone 130 travels on each road indicated on the map data 116a. That is to say, when the prediction 114 estimates the position of the portable telephone 130 after a specific time, this average behavior information may be used. In this way, the prediction 114 can estimate the position of the portable telephone 130 more accurately.

Furthermore, it is possible to make the server control unit 111 automatically update this average behavior information. That is to say, the server control unit 111 calculates averages of the moving speed and the moving direction of the portable telephone 130 at a specific position by using the detected position information, the moving speed and the moving direction contained in the prediction material data sent from the portable telephone 130, and reflects its result on the average behavior information. In this way, the prediction 114 can estimate the position of the portable telephone 130 more accurately as well as omitting efforts to update the average speed information.

In addition, it is possible to make the server control unit 111 automatically update the communication status data 117*a*. That is to say, because the server control unit 111 measures a radio wave density of the prediction material data sent from the portable telephone 130 to the base station 120, the measurement result can be reflected on the communication level of the communication status data 117*a*. In this way, the prediction 114 can predict the communication level of the portable telephone 130 more accurately as well as omitting tasks to update the communication status data 117*a*.

The second embodiment includes the portable telephone 130 as a mobile communication device, but the portable telephone 130 may be structured as a hands-free device or an automobile telephone device. In this case, since the mobile communication device is carried on an automobile, it does not cause any problem even if the map memory unit 116, etc. are equipped with the mobile communication device as described above and the device gets bigger. Also, if there is a terminal of a car navigation system within the automobile, functions of the car navigation may be used. In this case, the navigation unit 119, the map memory unit 116, etc. may be omitted from the server 110 so that the server 110 can be downsized. Moreover, if there is a device to obtain the road traffic information in the automobile, such a device may be used. In this case, the road information obtaining unit 112 may be omitted from the server 110 so that the server 110 can be made smaller.

The direction detecting unit 133*b* in the second embodiment detects a moving direction of the portable telephone 130 based on the detected position information, but it may be possible to make the direction detecting unit 133*b* detect a direction of a global magnetic field (East-West-South-North), and detect a moving direction of the portable telephone 130 based on the detected result. Additionally, in the second embodiment, although the speed detecting unit 133*c* is made to detect the moving speed of the portable telephone 130 based on the detected position information, it is also possible to make the speed detecting unit 133*c* detect the driving speed of the automobile and make this driving speed as a moving speed of the portable telephone 130 when the portable telephone 130 is catered in the automobile.

Also, in the present embodiment, the connection unit 115*b* of the prediction processing unit 115 automatically terminates the communication before the communication device 200 (portable telephone 130) enters into an area in a bad communication status, but it is possible to have the communication terminated automatically after the communication device 200 or portable telephone 130 enters into the area in the bad communication status. Furthermore, in the embodiment, the reconnection unit 115*b* reconnects the server 110 with the portable telephone 130, so that it is possible to have the portable telephone 130 reconnect with the server 110.

Then, in the embodiment, one server 110 and one base station 120 are provided, but a plural number of them can be arranged. That is to say, a plural number of the base stations 120 can be located all over the nation, and the server 110 can be set for each base station 120. In this way, a workload for the server 110 can be lightened. Additionally, the base station 120 may have the functions and structure of the server 110.

What is claimed is:

1. A communication device that is mobile and performs communication via a wireless communication medium, said communication device comprising:
    a position detecting unit operable to detect a current position of said communication device;
    a communication status retaining unit operable to retain communication status data indicating a wireless communication status at each position;
    a prediction unit operable to estimate a position of said communication device at a time when a specific time elapses according to the current position of said communication device detected by said position detecting unit, and predict the wireless communication status at the estimated position with reference to the communication status data; and
    a processing unit operable to execute a handling process for disconnection of the communication due to deterioration of the wireless communication status based on a prediction result by said prediction unit,
    wherein said processing unit is further operable to decide, when predicting that a state of said communication device is changed from incapable of communication to capable of communication based on the prediction result by said prediction unit whether or not the time allowed for the communication is shorter than the specific time, and prohibit incoming and outgoing calls to and from said communication device when deciding that the time allowed for the communication is shorter than the specific time.

2. The communication device according to claim 1, wherein said prediction unit is operable to estimate a position of said communication device at the time when a specific time elapses based on the current position detected by said position detecting unit, a moving direction of said communication device specified from a temporal transition of the current position detected by said position detecting unit, and a moving speed of said communication device specified from the temporal transition of the current position detected by said position detecting unit.

3. The communication device according to claim 1, wherein:
    said communication device further includes a direction detecting unit operable to detect a moving direction of said communication device, and a speed detecting unit operable to detect a moving speed of said communication device; and
    said prediction unit is operable to estimate a position of said communication device at the time when a specific time elapses based on the current position detected by said position detecting unit, the moving direction detected by said direction detecting unit, and the moving speed detected by said speed detecting unit.

4. The communication device according to claim 1, wherein said processing unit is operable to terminate the communication when the communication is predicted to be disconnected based on a prediction result by said prediction unit.

5. The communication device according to claim 1, wherein said processing unit is operable to specify the wireless communication status at the current position detected by said position detecting unit with reference to the communication status data, and execute a reconnection process when the disconnected communication is decided to be re-connectable based on the specified wireless communication status.

6. The communication device according to claim 5, wherein said processing unit is further operable to report, when predicting the communication is possible again based on the prediction result by said prediction unit after the communication is disconnected due to deterioration of the wireless communication status, to a user of said communication device and a user of another device as communication party, the time that is required for the disconnected communication to be re-connectable.

7. The communication device according to claim 6, wherein said prediction unit is operable to estimate, when obtaining route information indicating a route to a destination from a navigation unit that navigates the user of said communication device to the destination, a position of said communication device at the time when a specific time elapses based on the current position detected by said position detecting unit and the route indicated in the route information.

8. The communication device according to claim 7, wherein said prediction unit is further operable to specify, when obtaining traffic road information indicating a traffic condition on each road, a moving speed of said communication device according to the traffic road information content, and estimate a position of said communication device at the time when a specific time elapses.

9. The communication device according to claim 1, wherein said processing unit is operable to report, when predicting that the communication is disconnected based on the prediction result by said prediction unit, to a user of said communication device and a user of another device as a communication party, that the communication is terminated.

10. The communication device according to claim 9, wherein said processing unit is operable to report to the user of said communication device by presenting the report to the user of said communication with at least one of a character and a graphic.

11. The communication device according to claim 1, wherein said processing unit is operable to report, when predicting the communication is disconnected at the time when a specific time elapses due to deterioration of the wireless communication status based on the prediction result by said prediction unit, to a user of said communication device and a user of another device as a communication party, the time allowed for the communication.

12. The communication device according to claim 1, wherein said processing device is operable to report, when predicting the communication becomes possible again after the communication is disconnected due to deterioration of the wireless communication status based on the prediction result by said prediction unit, to a user of said communication device and a user of another device as a communication party, the time that is required for the communication to be re-connectable.

13. The communication device according to claim 1, wherein said prediction unit is operable to estimate, when obtaining route information indicating a route to a destination from a navigation unit that navigates a user of said communication device to the destination, a position of said communication device at the time when a specific time elapses based on the current position detected by said position detecting unit and the route indicated in the route information.

14. The communication device according to claim 13, wherein said prediction unit is operable to specify, when obtaining traffic route information indicating a traffic condition on each road, a moving speed of said communication device according to the traffic road information, and estimate a position of said communication device at the time when a specific time elapses.

15. The communication device according to claim 13, wherein said prediction unit is operable to specify, when obtaining speed limit information indicating a speed limit of each road, a moving speed of said communication device according to the speed limit information, and estimate a position of said communication device at the time when a specific time elapses.

16. The communication device according to claim 1, wherein said communication device is a portable telephone, a hands-free device, or an automobile telephone.

17. A communication method used for a communication device that is mobile and performs communication via a wireless communication medium, said method including:
   detecting a current position of the communication device;
   estimating a position of the communication device at a time when a specific time elapses based on the current position of the communication device detected in said detecting of the current position of the communication device;
   predicting a wireless communication status at the estimated position with reference to communication status data indicating a wireless communication status at each position; and
   executing a handling process for disconnection of the communication due to deterioration of the wireless communication status based on a prediction result in said predicting of the wireless communication status at the estimated position,
   wherein said executing of the handling process includes deciding, when said predicting of the wireless communication status at the estimated position predicts that a state of the communication device is changed from incapable of communication to capable of communication, whether or not the time allowed for the communication is shorter than the specific time, and prohibiting incoming and outgoing calls to and from the communication device when deciding that the time allowed for the communication is shorter than the specific time.

18. The communication method according to claim 17, wherein said executing of the handling process includes terminating the communication when said predicting of the wireless communication status at the estimated position predicts that the communication is to be disconnected.

19. The communication method according to claim 18, wherein said executing of the handling process includes:
   specifying the wireless communication status at the current position detected said detecting of the current position of the communication device with reference to the communication status data; and
   conducting a reconnection process when the disconnected communication is decided to be re-connectable based on the wireless communication status specified in said specifying of the wireless communication status.

20. A program, recorded on a computer-readable medium, for a communication device that is mobile and performs communication via a wireless communication medium, said program causing the communication device to perform operations including:
   a current position of the communication device;
   estimating a position of the communication device at a time when a specific time elapses based on the current position of the communication device detected in said detecting of the current position of the communication device;

predicting a wireless communication status at the estimated position with reference to communication status data indicating the wireless communication status at each position; and executing a handling process for disconnection of the communication due to deterioration of the wireless communication status based on a prediction result in said predicting of the wireless communication status at the estimated position, wherein said executing of the handling process includes deciding, when said predicting of the wireless communication status at the estimated position predicts that a state of the communication device is changed from incapable of communication to capable of communication, whether or not the time allowed for the communication is shorter than the specific time, and prohibiting incoming and outgoing calls to and from the communication device when deciding that the time allowed for the communication is shorter than the specific time.

21. A communication system where a mobile communication device communicates with other communication device via a wireless communication medium, said communication system comprising:

a mobile communication device operable to perform wireless communication;

a position detecting unit operable to detect a current position of said mobile communication device;

a communication status storage unit operable to retain communication status data indicating a wireless communication status at each position;

a prediction unit operable to estimate a position of said mobile communication device at a time when a specific time elapses based on the current position of said mobile communication device detected by said position detecting unit, and predicts the wireless communication status at the position with reference to the communication status data; and a processing unit operable to execute a handling process for disconnection of the communication between said mobile communication device and another communication device due to deterioration of the communication status based on a prediction result by said prediction unit, wherein:

said processing unit is further operable to decide, when said prediction unit predicts that a state of said mobile communication device is changed from incapable of communication to capable of communication, whether or not the time allowed for the communication is shorter than the specific time, and prohibit incoming and outgoing calls to and from said mobile communication device when deciding that the time allowed for the communication is shorter than the specific time;

the other communication device is mobile and is operable to perform wireless communication with said mobile communication device;

said prediction unit is operable to estimate a position of said mobile communication device and a position of the other communication device at the time when the specific time elapses, and predict a wireless communication status at each of the estimated positions; and said processing unit is further operable to predict that the communication is possible between said mobile communication device and the other communication device only when said mobile communication device and the other communication device are simultaneously capable of wireless communication based on the prediction result by said prediction unit.

22. The communication system according to claim 21, wherein said prediction unit is operable to estimate a position of said mobile communication device at the time when a specific time elapses based on the current position detected by said position detecting device, a moving direction of said mobile communication device specified from a temporal transition of the current position detected by said position detecting device, and a moving speed of said mobile communication device specified from temporal transition of the current position detected by said position detecting device.

23. The communication system according to claim 21, wherein:

said communication system further includes a direction detecting unit operable to detect a moving direction of said mobile communication device, and a speed detecting unit operable to detect a moving speed of said mobile communication device; and said prediction unit prediction unit is operable to estimate a position of said mobile communication device at the time when a specific time elapses based on the current position detected by said position detecting unit, the moving direction detected by said direction detecting unit, and the moving speed detected by said speed detecting unit.

24. The communication system according to claim 21, wherein said processing unit is operable to cause said mobile communication device to terminate the communication when the communication between said mobile communication device and the other communication device is predicted to be impossible based on the prediction result by said prediction unit.

25. The communication system according to claim 21, wherein:

said communication system further includes a relaying unit operable to relay a signal exchanged between said mobile communication device and the other communication device; and said processing unit is operable to specify a wireless communication status at the current position detected by said position detecting unit with reference to the communication status data, maintain the communication between said relaying unit and the other communication device, and put the other communication device on hold when deciding the communication between said mobile communication device and said relaying unit becomes impossible based on the specified wireless communication status.

26. The communication system according to claim 25, wherein said processing unit is operable to decide, when predicting the communication between said mobile communication device and the other communication device becomes impossible based on the prediction result by said prediction unit, whether or not the time that is not allowed for the communication is the same as or shorter than a maximum holding time, put the other communication device on hold while the communication is not allowed when deciding that the time that is not allowed for communication is the same as or shorter than the maximum holding time, and terminate the communication of the other communication device when deciding that the time that is not allowed for communication is longer than the maximum holding time.

27. The communication system according to claim 26, wherein:
said mobile communication device is operable to send a time setup signal indicating the maximum holding time to said processing unit; and
said processing unit is operable to use the maximum holding time indicated in the time setup signal sent from said mobile communication device.

28. The communication system according to claim 26, wherein said processing unit is further operable to specify a wireless communication status of the current position detected by said position detecting unit with reference to the communication status data, and executes execute a reconnection process when the communication disconnected between said mobile communication device and the other communication device is decided to be re-connectable based on the specified wireless communication status.

29. The communication system according to claim 28, wherein:
said processing unit is further operable to send, when predicting the communication between said mobile communication device and the other communication device becomes capable again after being incapable based on the prediction result by said prediction unit, a reconnection time reporting signal reporting a reconnection time in which the communication is required to be re-connectable; and
said mobile communication device and the other communication device are operable to report, when obtaining the reconnection time reporting signal, the reconnection time to a user of said mobile communication device and a user of the other communication device.

30. The communication system according to claim 29, wherein said prediction unit is operable to estimate, when obtaining route information indicating a route to a destination from a navigation unit that navigates the user of said mobile communication device to the destination, a position of said mobile communication device at the time when a specific time elapses based on the position detected by said position detecting unit and the route indicated in the route information.

31. The communication system according to claim 30, wherein said prediction unit further is operable to specify, when obtaining traffic road information indicating a traffic condition on each road, a moving speed of said mobile communication device according to the traffic road information, and estimate a position of said mobile communication device at the time when a specific time elapses.

32. The communication system according to claim 21, wherein said processing unit is operable to specify a wireless communication status of the current position detected by said position detecting unit with reference to the communication status data, and execute a reconnection process when reconnection of the communication disconnected between said mobile communication device and the other communication device is decided to be possible based on the specified wireless communication status.

33. The communication system according to claim 21, wherein:
said processing unit is operable to send, when predicting the communication taking place between said mobile communication device and the other communication device becomes impossible based on the prediction result by said prediction unit, a termination reporting signal, which reports that the communication is terminated, to said mobile communication device and the other communication device communicating with said mobile communication device; and
said mobile communication device and the other communication device are each operable to report to their respective users in advance that the communication is to be terminated when obtaining the termination reporting signal.

34. The communication system according to claim 33, wherein said mobile communication device is operable to report to the user of said mobile communication device by presenting the report to the user of said mobile communication device with at least one of a character and a graphic.

35. The communication system according to claim 33, wherein said mobile communication device and the other communication device are each operable to present the report in advance to their respective users through an audible output.

36. The communication system according to claim 21, wherein:
said processing unit is operable to send, when predicting the communication taking place between said mobile communication device and the other communication device becomes impossible at the time when a specific time elapses based on the prediction result by said prediction unit, a communication time reporting signal, which reports a time that is allowed for the communication, to said mobile communication device and the other communication device; and
said mobile communication device and the other communication device are each operable to report the communication time to their respective users when obtaining the communication time reporting signal.

37. The communication system according to claim 21, wherein
said processing unit is operable to send, when predicting the communication that occurred between said mobile communication device and the other communication device becomes capable after being incapable based on the prediction result by said prediction unit, a reconnection time reporting signal, which reports on a reconnection time in which the communication is required to be re-connectable, to said mobile communication device and the other communication device;
said mobile communication device and the other communication device are each operable to report the reconnection time to their respective users when obtaining the reconnection time reporting signal.

38. The communication system according to claim 21, wherein:
said mobile communication device is operable to send a time setup signal indicating the minimum communication time to said processing unit; and
said processing unit is operable to use the minimum calling time indicated by the time setup signal sent from said mobile communication device.

39. The communication system according to claim 21, wherein said prediction unit is operable to estimate, when obtaining route information indicating a route to a destination from a navigation unit that navigates a user of said mobile communication device to the destination, a position of said mobile communication device at the time when a specific time elapses based on the current position detected by said position detecting unit and the route indicated in the route information.

40. The communication system according to claim 39, wherein said prediction unit is operable to specify, when obtaining traffic road information indicating a traffic condition on each road, a moving speed of said mobile communication device according to the traffic road information, and estimate a position of said mobile communication device at the time when a specific time elapses.

41. The communication system according to claim 39, wherein said prediction unit is operable to specify, when obtaining speed limit information indicating a speed limit of each road, a moving speed of the mobile communication device according to the speed limit information, and
 estimate a position of said mobile communication device at the time when a specific time elapses.

42. The communication system according to claim 21, wherein said communication system further includes:
 a specifying unit operable to specify an average moving speed and an average moving direction of said mobile communication device at a specific position based on the current position detected by said position detecting unit; and
 a retaining unit operable to retain a result specified by said specifying unit as average behavior information,
 wherein said prediction unit is operable to specify a moving speed and moving direction of said mobile communication device according to the average behavior information, and estimate a position of said mobile communication device at the time when a specific time elapses.

43. The communication system according to claim 21, wherein said communication system further includes:
 a measurement unit operable to measure a signal intensity of a wireless signal sent from said mobile communication device; and
 an updating unit operable to update the communication status data based on a measurement result of said measurement unit.

44. The communication system according to claim 21, wherein
 said mobile communication device is operable to send standard information indicating a standard to decide whether or not the communication between said mobile communication device and the other communication device is possible from the wireless communication status predicted by said prediction unit; and
 said processing unit is operable to decide whether or not the communication is possible based on the standard indicated in the standard information when obtaining the standard information from said mobile communication device.

45. The communication system according to claim 21, wherein said mobile communication device is a portable telephone, a hands-free device or an automobile phone.

46. A communication method for having a mobile communication device communicate with another communication device via a wireless communication medium, said method including:
 detecting a current position of the mobile communication device that performs wireless communication;
 estimating a position of the mobile communication device at the time when a specific time elapses based on the current position detected in said detecting of the current position of the mobile communication device;
 predicting a wireless communication status at the estimated position with reference to communication status data indicating the wireless communication status at each position; and
 executing a handling process for disconnection of the communication between the mobile communication device and the other communication device due to deterioration of the wireless communication status based on a prediction result in said predicting of the wireless communication status at the estimated position, wherein:
 said executing of the handling process includes deciding, when said predicting of the wireless communication status at the estimated position predicts that a state of the mobile communication device is changed from incapable of communication to capable of communication, whether or not the time allowed for the communication is shorter than the specific time, and prohibiting incoming and outgoing calls to and from the mobile communication device when deciding that the time allowed for the communication is shorter than the specific time;
 the other communication device is mobile and performs wireless communication;
 said estimating of the position of the mobile communication device includes estimating a position of the mobile communication device and a position of the other communication device at the time when the specific time elapses;
 said predicting of the of the wireless communication status at the estimated position includes estimating a wireless communication status of each of the mobile communication device and the other communication device at their estimated positions; and
 said executing of the handling process includes predicting that the communication is possible between the mobile communication device and the other communication device when the mobile communication device and the other communication are simultaneously capable of wireless communication based on a prediction result in said predicting of the wireless communication status of each of the mobile communication device and the other communication device at their estimated positions.

47. The communication method according to claim 46, wherein said executing of the handling process includes causing the mobile communication device to terminate the communication when predicting the communication between the mobile communication device and the other communication device becomes impossible based on the prediction result in said predicting of the wireless communication status of each of the mobile communication device and the other communication device at their estimated positions.

48. The communication method according to claim 46, wherein said executing of the handling process includes:
 specifying a wireless communication status at the current position of the mobile communication device detected in said detecting of the current position of the mobile communication device with reference to the communication status data;
 deciding whether or not the communication taking place between the mobile communication device and the other communication device becomes impossible based on the wireless communication status specified in said specifying of the wireless communication status at the current position of the mobile communication device; and
 maintaining the communication between a relay unit and the other communication device and putting the other communication device on hold when the communication is decided to be impossible in said deciding whether the communication taking place between the mobile communication device and the other communication device becomes impossible.

49. A program recorded on a computer-readable medium, for a communication system where a mobile communication device communicates with another communication device via a wireless communication medium, said program causing the mobile communication device to perform operations including:

- detecting a current position of the mobile communication device that performs wireless communication;
- estimating a position of the mobile communication device at a time when a specific time elapses based on the current position detected in said detecting of the current position of the mobile communication device;
- predicting a wireless communication status at the estimated position with reference to communication status data indicating the wireless communication status at each position; and
- executing a handling process for disconnection of the communication between the mobile communication device and the other communication device due to deterioration of the wireless communication status based on a prediction result in said predicting of the wireless communication status at the estimated position, wherein:
- said executing of the handling process includes deciding, when said predicting of the wireless communication status at the estimated position predicts that a state of the mobile communication device is changed from incapable of communication to capable of communication, whether or not the time allowed for the communication is shorter than the specific time, and prohibiting incoming and outgoing calls to and from the mobile communication device when deciding that the time allowed for the communication is shorter than the specific time;
- the other communication device is mobile and performs wireless communication;
- said estimating of the position of the mobile communication device includes estimating a position of the mobile communication device and a position of the other communication device at the time when the specific time elapses;
- said predicting of the of the wireless communication status at the estimated position includes estimating a wireless communication status of each of the mobile communication device and the other communication device at their estimated positions; and
- said executing of the handling process includes predicting that the communication is possible between the mobile communication device and the other communication device when the mobile communication device and the other communication are simultaneously capable of wireless communication based on a prediction result in said predicting of the wireless communication status of each of the mobile communication device and the other communication device at their estimated positions.

* * * * *

UNITED STATES PATENT AND TRADEMARK OFFICE
CERTIFICATE OF CORRECTION

PATENT NO. : 7,206,588 B2
APPLICATION NO. : 10/382654
DATED : April 17, 2007
INVENTOR(S) : Ken-ichi Moriguchi et al.

It is certified that error appears in the above-identified patent and that said Letters Patent is hereby corrected as shown below:

In column 38, claim 1, line 28, please change "prediction unit whether" to --prediction unit, whether--.

In column 40, claim 20, line 65, please change "a current position" to --detecting a current position--.

In column 43, claim 27, line 13, please change "executes execute a reconnection" to --execute a reconnection--.

In column 46, claim 46, line 23, please change "of the of the" to --of the--.

In column 47, claim 49, line 1, please change "A program" to --A program,--.

In column 48, claim 49, line 13, please change "of the of the" to --of the--.

Signed and Sealed this

Eighteenth Day of September, 2007

JON W. DUDAS
*Director of the United States Patent and Trademark Office*